US012667103B2

(12) United States Patent
Bletsky et al.

(10) Patent No.: US 12,667,103 B2
(45) Date of Patent: Jun. 30, 2026

(54) METHODS AND COMPOSITIONS COMPRISING HERBICIDALLY ACTIVE COMPOUNDS AND THIOCYANATE COMPOUNDS FOR CONTROLLING WEED GROWTH

(71) Applicant: MUSTGROW BIOLOGICS CORP., Saskatoon (CA)

(72) Inventors: Colin Bletsky, Saskatoon (CA); Todd Lahti, Saskatoon (CA); Corey Giasson, Corman Park (CA); David Maenz, Saskatoon (CA)

(73) Assignee: MUSTGROW BIOLOGICS CORP., Saskatoon (CA)

( * ) Notice: Subject to any disclaimer, the term of this patent is extended or adjusted under 35 U.S.C. 154(b) by 394 days.

(21) Appl. No.: 18/033,250

(22) PCT Filed: Oct. 21, 2021

(86) PCT No.: PCT/CA2021/051483

§ 371 (c)(1),
(2) Date: Apr. 21, 2023

(87) PCT Pub. No.: WO2022/082311

PCT Pub. Date: Apr. 28, 2022

(65) Prior Publication Data

US 2024/0000083 A1 Jan. 4, 2024

Related U.S. Application Data

(60) Provisional application No. 63/094,517, filed on Oct. 21, 2020, provisional application No. 63/094,540, filed on Oct. 21, 2020.

(51) Int. Cl.

| | |
|---|---|
| ***A01N 47/48*** | (2006.01) |
| ***A01N 57/20*** | (2006.01) |
| ***A01P 13/00*** | (2006.01) |

(52) U.S. Cl.

CPC ............. *A01N 47/48* (2013.01); *A01N 57/20* (2013.01); *A01P 13/00* (2021.08)

(58) Field of Classification Search

CPC ......... A01N 57/20; A01N 47/48; A01N 65/08
See application file for complete search history.

(56) References Cited

U.S. PATENT DOCUMENTS

| | | | |
|---|---|---|---|
| 2,642,353 | A | 6/1953 | Mowry et al. |
| 4,062,669 | A | 12/1977 | Franz et al. |
| 4,612,034 | A | 9/1986 | Kruger et al. |
| 2008/0182751 | A1 | 7/2008 | Morra et al. |

FOREIGN PATENT DOCUMENTS

| | | | |
|---|---|---|---|
| JP | 46040356 | B | 11/1971 |
| JP | 59144707 | A | 8/1984 |
| WO | 2007/147209 | A1 | 12/2007 |
| WO | 2009/012485 | | 1/2009 |
| WO | 2021/077214 | | 4/2021 |

OTHER PUBLICATIONS

Brown et al., "Glucosinolate-Containing Seed Meal as a Soil Amendment to Control Plant Pests". Office of Scientific and Technical Information, Jul. 1, 2005 (Jul. 1, 2005), vol. NREL(SR-510-35254), pp. 1-95.

Handiseni, "Fungicidal and herbicidal properties of *Brassica napus*, *Brassicajuncea* and Sinapis alba seed meal amended soils and phytotoxicity on tomato and pepper.". Thesis: University of Idaho, Jan. 2009 (2009).

Boydston, "Mustard (*Sinapis alba*) Seed Meal Suppresses Weeds in Container-grown Ornamentals". HortScience, Jun. 2008 (Jun. 2008), vol. 43(3), pp. 800-803.

Colby, "Calculating Synergistic and Antagonistic Responses of Herbicide Combinations". Weeds, Jan. 1967 (1967), vol. 15(1), pp. 20-22.

Morra Matthew J. et al: "Bioherbicidal activity of Sinapis alba seed meal extracts" Industrial Crops and Products.

Anon: Global HRAC MOA Classification Working Group Report Version, Jun. 2, 2020.

Anon: Amitrole T Herbicide—Jan. 8, 2014.

*Primary Examiner* — John Pak

(74) *Attorney, Agent, or Firm* — Smart & Biggar LP; Micheline Gravelle

(57) ABSTRACT

Provided are methods and compositions to control growth of weed plants. The compositions include an herbicidally effective amount of an herbicidally active chemical compound and a thiocyanate, together with an herbicidally acceptable diluent, carrier or excipient. The thiocyanate preparation can be provided in the form of a glucosinolate hydrolysate obtained from *Sinapis alba* plant material. Methods of making and using the formulations are also provided.

7 Claims, 4 Drawing Sheets

METHODS AND COMPOSITIONS COMPRISING HERBICIDALLY ACTIVE COMPOUNDS AND THIOCYANATE COMPOUNDS FOR CONTROLLING WEED GROWTH

CROSS-REFERENCE TO RELATED APPLICATIONS

This application is a National Phase Entry Application of PCT/CA2021/051483, filed Oct. 21, 2021, which claims the benefit of U.S. Provisional Application No. 63/094,517, filed Oct. 21, 2020 and U.S. Provisional Application No. 63/094,540, filed Oct. 21, 2020; the entire contents of Patent Application Nos. 63/094,517 and 63/094,540 are hereby incorporated by reference.

FIELD OF THE DISCLOSURE

The present disclosure relates to methods and compositions for controlling weed growth. In particular, the present disclosure relates to compositions comprising herbicidally active compounds and a thiocyanate.

BACKGROUND OF THE DISCLOSURE

The following paragraphs are not an admission that anything discussed in them is prior art or part of the knowledge of persons skilled in the art.

The growth of undesirable plants, such as weeds, can reduce the amount of resources available to cultivated plants and can thus have a negative effect on the cultivated plants' quality, health or yield. A wide variety of chemical herbicides and herbicidal application techniques and equipment have evolved to control the growth of weeds in commercial agriculture, as well as in horticulture, where weeds are often deemed to be unsightly. However, the large scale use of chemical herbicides has resulted in significant concerns regarding the environmental impact and toxicity of herbicide use on non-target species, including humans, since less than careful use of herbicidal products may adversely affect the environment, as well as human health. Thus, for example, several countries have recently taken steps to restrict the use of the herbicide glyphosate over human health concerns.

There is, therefore, a need in the art for methods to improve the yield, quality, and health of cultivated plants. In particular, there is a need for herbicidal formulations and techniques for making such formulations which allow for the control of undesirable plants, which at the same time can reduce the use of chemical herbicidal compounds.

SUMMARY OF THE DISCLOSURE

The following paragraphs are intended to introduce the reader to the more detailed description that follows and not to define or limit the claimed subject matter.

The present disclosure relates to methods and herbicidal compositions and methods for weed growth control.

In an aspect, the methods involve the application of a combination of an herbicidally active chemical compound and a biological herbicide to effectively control weed growth. The herbicidally active chemical compound can be selected from a range of herbicidal chemical compounds. The biological herbicide comprises a thiocyanate. In this aspect of the present disclosure, the amounts of the herbicidally active chemical compound conventionally required to control weeds may be significantly reduced as a result of the co-application of the thiocyanate. In one aspect, the application can be a pre-emergent weed treatment. In another aspect, the application can be a post-emergent weed treatment.

Accordingly, the present disclosure provides, in at least one aspect, in at least one embodiment, a method for controlling growth of a weed plant, the method comprising co-applying an herbicidally effective amount of an herbicidally active chemical compound and an herbicidally effective amount of a thiocyanate to a weed plant to thereby control growth of the weed plant.

In at least one embodiment, in an aspect, a first formulation comprising the herbicidally active chemical compound and a second formulation comprising the thiocyanate can be sequentially co-applied to the weed plant.

In at least one embodiment, in an aspect, a first formulation comprising the herbicidally active compound and a second formulation comprising the thiocyanate can be simultaneously co-applied to the weed plant.

In at least one embodiment, in an aspect, the herbicidally active chemical compound and the thiocyanate can be co-formulated to form a co-formulated herbicidal formulation, and the co-formulated herbicidal formulation can be applied to the weed plant.

In at least one embodiment, in an aspect, the herbicidally active chemical compound can be an organocarboxy compound.

In at least one embodiment, in an aspect, the herbicidally active organocarboxy compound can be selected from the group consisting of 2,4-diclorophenoxyacetic acid (2,4D), 3,6-dichloro-2-methoxybenzoic acid (dicamba), (R,S)-2-amino-4-(hydroxymethyl)phosphonoyl)butanoic acid (glufosinate; phosphinotricin), and N-(phosphomethyl)glycine (glyphosate), or herbicidally acceptable salts thereof.

In at least one embodiment, in an aspect, the herbicidally active chemical compound can be met2-{[4-methoxy-6-methyl-1,3,5-triazin-2-yl)amino]-oxomethyl] sulfamoyl}benzoic acid methyl ester (metsulfuron methyl), or an herbicidally acceptable salt thereof.

In at least one embodiment, in an aspect, the herbicidally active chemical compound can be applied in an amount which is at least about 33% (w/w) lower than the amount applied if the herbicidally active chemical compound was solely applied to control the weed plant.

In at least one embodiment, in an aspect, the herbicidally active chemical compound can be applied in an amount which is up to about 90% (w/w) lower than the amount applied if the herbicidally active chemical compound was solely applied to control the weed plant.

In at least one embodiment, in an aspect, the herbicidally active chemical compound can be N-(phosphomethyl)glycine (glyphosate) which is applied at a rate of from about 5 gram to about 550 gram herbicidally active chemical compound per acre.

In at least one embodiment, in an aspect, the herbicidally active chemical compound can be 3,6-dichloro-2-methoxybenzoic acid (dicamba), which is applied at a rate of from about 500 gram to about 950 gram herbicidally active chemical compound per acre.

In at least one embodiment, in an aspect, the herbicidally active chemical compound can be 2,4-diclorophenoxyacetic acid (2,4-D), which is applied at a rate of from about 100 gram to about 250 gram herbicidally active chemical compound per acre.

In at least one embodiment, in an aspect, the herbicidally active chemical compound can be (R,S)-2-amino-4-(hydroxymethyl)phosphonoyl)butanoic acid (glufosinate; phosphinotricin), which is applied at a rate of from about 450 gram to about 890 gram herbicidally active chemical compound per hectare.

In at least one embodiment, in an aspect, the herbicidally active chemical compound can be met2-{[4-methoxy-6-methyl-1,3,5-triazin-2-yl)amino]-oxomethyl] sulfamoyl}benzoic acid methyl ester (metsulfuron methyl), which is applied at a rate of about 0.9 gram to about 3 gram herbicidally active chemical compound per acre.

In at least one embodiment, in an aspect, the thiocyanate can be applied at a rate of from about 25 gram to about 25 kg thiocyanate per acre.

In at least one embodiment, in an aspect, the thiocyanate can be selected from allyl thiocyanate (ATC) or a thiocyanate ion (SCN).

In at least one embodiment, in an aspect, the second formulation containing the thiocyanate can be formulated to be applied at a rate of 25 gram to 25 kilogram dry weight active per acre and the first formulation for co-application containing the herbicidally active chemical compound can be formulated to be applied at a ratio of from 1:0.05 to 1:5,000 dry weight active per acre.

In at least one embodiment, in an aspect, the second formulation containing the thiocyanate can be formulated to be applied at a rate of 250 gram to 25 kilogram dry weight active per acre and the first formulation for co-application containing the herbicidally active chemical compound can be formulated to be applied at a ratio of from 1:0.5 to 1:5,000 dry weight active per acre.

In at least one embodiment, in an aspect, the second formulation containing the thiocyanate can be formulated to be applied at a rate of 2.5 kg to 25 kilogram dry weight active per acre and the first formulation for co-application containing the herbicidally active chemical compound can be formulated to be applied at a ratio of from 1:5 to 1:5,000 dry weight active per acre.

In at least one embodiment, in an aspect, the thiocyanate can be included in a hydrolyzed glucosinolate preparation obtained from *Sinapis alba.*

In at least one embodiment, in an aspect, the hydrolyzed glucosinolate preparation can be a plant seed extract obtained from *Sinapis alba.*

In at least one embodiment, in an aspect, the hydrolyzed glucosinolate preparation can be a plant seed meal extract obtained from *Sinapis alba.*

In at least one embodiment, in an aspect, the herbicidally active chemical compound and the thiocyanate can be applied to the weed plant pre-emergence of a cultivated plant.

In at least one embodiment, in an aspect, the herbicidally active chemical compound and the thiocyanate can be applied to the weed plant post-emergence of a cultivated plant.

In at least one embodiment, in an aspect, the chemical compound and the thiocyanate can be applied to the foliage of a weed plant.

In at least one embodiment, in an aspect, the cultivated plant can be an agricultural plant or a horticultural plant.

In at least one embodiment, in an aspect, the agricultural plant can be wheat (*Triticum aestivum*), corn (*Zea mays*), rice (*Oryza sativa*), soybean (*Glycine max*), oilseed rape (*Brassica napus*), sunflower (*Helianthus annuus*), cotton (*Gossypium hirsutum*), peanut (*Arachis hypogaea*), tomato (*Solanum lycopersicum*), and *Cannabis* (*Cannabis sativa*).

In at least one embodiment, in an aspect, the weed plant can be a dicotelydenous weed plant or monocotelydenous weed plant.

In at least one embodiment, in an aspect, the weed plant can be a perennial weed plant.

In at least one embodiment, in an aspect, the first formulation comprising the herbicidally active compound and/or the second formulation comprising the thiocyanate and/or the co-formulated herbicidal formulation can further comprise an herbicidally acceptable diluent, carrier or excipient.

In another aspect, the present disclosure relates to formulations for weed growth control. Accordingly, the present disclosure provides, in at least one aspect, in at least one embodiment, an herbicidal formulation comprising:

an herbicidally effective amount of an herbicidally active chemical compound and a thiocyanate together with an herbicidally acceptable diluent, carrier or excipient.

In at least one embodiment, in an aspect, the herbicidally active chemical compound can be an organocarboxy compound.

In at least one embodiment, in an aspect, the herbicidally active organocarboxy compound can be selected from the group consisting of 2,4-diclorophenoxyacetic acid (2,4D), 3,6-dichloro-2-methoxybenzoic acid (dicamba), (R,S)-2-amino-4-(hydroxymethyl)phosphonoyl)butanoic acid (glufosinate; phosphinotricin), and N-(phosphomethyl)glycine (glyphosate), or herbicidally acceptable salts thereof.

In at least one embodiment, in an aspect, the herbicidally active chemical compound can be met2-{[4-methoxy-6-methyl-1,3,5-triazin-2-yl)amino]-oxomethyl] sulfamoyl}benzoic acid methyl ester (metsulfuron methyl), or an herbicidally acceptable salt thereof.

In at least one embodiment, in an aspect, the herbicidally active chemical compound can be included in the herbicidal formulation in an amount which is at least about 33% (w/w) lower than the amount included in the herbicidal formulation if the chemical herbicide was included in an herbicidal formulation for sole application to control weed plants.

In at least one embodiment, in an aspect, the herbicidally active chemical compound can be included in the herbicidal formulation in an amount which is up to about 90% (w/w) lower than the amount included in the herbicidal formulation if the chemical herbicide was included in an herbicidal formulation for sole application to control weed plants.

In at least one embodiment, in an aspect, the herbicidally active chemical compound can be N-(phosphomethyl)glycine (glyphosate), and the herbicidal formulation can be formulated so that the herbicidal formulation can be applied at a rate of from about 5 gram to about 550 gram chemical herbicide per acre.

In at least one embodiment, in an aspect, the herbicidally active chemical compound can be 3,6-dichloro-2-methoxybenzoic acid (dicamba) and the herbicidal formulation can be formulated so that the herbicidal formulation can be applied at a rate of from about 500 gram to about 950 gram chemical herbicide per acre.

In at least one embodiment, in an aspect, the herbicidally active chemical compound can be 2,4-diclorophenoxyacetic acid (2,4-D), and the weed control composition can be formulated so that the herbicidal formulation can be applied at a rate of from about 100 gram to about 250 gram chemical herbicide per acre.

In at least one embodiment, in an aspect, the herbicidally active chemical compound can be (R,S)-2-amino-4-(hydroxymethyl)phosphonoyl)butanoic acid (glufosinate; phosphinotricin), and the herbicidal formulation can be formulated so that the herbicidal formulation can be applied at a rate of from about 450 gram to about 890 gram chemical herbicide per hectare.

In at least one embodiment, in an aspect, the herbicidally active chemical compound can be met2-{[4-methoxy-6-methyl-1,3,5-triazin-2-yl)amino]-oxomethyl] sulfamoyl}benzoic acid methyl ester (metsulfuron methyl), and the herbicidal formulation can be formulated so that the herbicidal formulation can be applied at a rate of about 0.9 gram to about 3 gram chemical herbicide per acre.

In at least one embodiment, in an aspect, the herbicidally active chemical compound can be formulated so that the herbicidal formulation can be applied at a rate of from about 25 gram to about 25 kilogram thiocyanate per acre.

In at least one embodiment, in an aspect, the herbicidal formulation can be formulated to be applied at a rate of 25 gram to 25 kilogram dry weight thiocyanate per acre, and at a ratio of 1:0.05 to 1:5,000 dry weight of the herbicidally active chemical compound per acre.

In at least one embodiment, in an aspect, the herbicidal formulation can be formulated to be applied at a rate of 250 gram to 25 kilogram dry weight thiocyanate per acre, and at a ratio of 1:0.5 to 1:5,000 dry weight of the herbicidally active chemical compound per acre.

In at least one embodiment, in an aspect, the herbicidal formulation can be formulated to be applied at a rate of 2.5 gram to 25 kilogram dry weight thiocyanate per acre, and at a ratio of 1:5 to 1:5,000 dry weight of the herbicidally active chemical compound per acre.

In at least one embodiment, in an aspect, the thiocyanate can be allyl thiocyanate (ATC) a thiocyanate ion (SCN).

In at least one embodiment, in an aspect, the thiocyanate can be included in the formulation in the form of a hydrolyzed glucosinolate preparation obtained from *Sinapis alba.*

In at least one embodiment, in an aspect, the hydrolyzed glucosinolate preparation can be a plant seed extract obtained from *Sinapis alba.*

In at least one embodiment, in an aspect, the hydrolyzed glucosinolate preparation can be a plant seed meal extract obtained from *Sinapis alba.*

In another aspect, present disclosure provides, in at least one embodiment, a method of preparing an herbicidal formulation, the method comprising (a) providing an herbicidally effective amount of an herbicidally active chemical compound;
(b) providing a thiocyanate; and
(c) mixing the herbicidally active chemical compound and the thiocyanate together with an herbicidally acceptable diluent, carrier or excipient to form an herbicidal formulation.

In at least one embodiment, in an aspect, the herbicidally active chemical compound can be an organocarboxy compound.

In at least one embodiment, in an aspect, the herbicidally active organocarboxy compound can be selected from the group consisting of 2,4-diclorophenoxyacetic acid (2,4D), 3,6-dichloro-2-methoxybenzoic acid (dicamba), (R,S)-2-amino-4-(hydroxymethyl)phosphonoyl)butanoic acid (glufosinate; phosphinotricin), and N-(phosphomethyl)glycine (glyphosate), or herbicidally acceptable salts thereof.

In at least one embodiment, in an aspect, the herbicidally active chemical compound can be met2-{[4-methoxy-6-methyl-1,3,5-triazin-2-yl)amino]-oxomethyl] sulfamoyl}benzoic acid methyl ester (metsulfuron methyl).

In at least one embodiment, in an aspect, the herbicidally active chemical compound can be included in the herbicidal formulation in an amount which is at least about 33% (w/w) lower than the amount included in the herbicidal formulation if the chemical herbicide was included in an herbicidal formulation for sole application to control weeds.

In at least one embodiment, in an aspect, the herbicidally active chemical compound can be included in the herbicidal formulation in an amount which is up to about 90% (w/w) lower than the amount included in the herbicidal formulation if the chemical herbicide was included in an herbicidal formulation for sole application to control weeds.

In at least one embodiment, in an aspect, the herbicidally active chemical compound can be N-(phosphomethyl)glycine (glyphosate), and the herbicidal formulation can be formulated so that the herbicidal formulation can be applied at a rate of from about 5 gram to about 550 gram chemical herbicide per acre.

In at least one embodiment, in an aspect, the herbicidally active chemical compound can be 3,6-dichloro-2-methoxybenzoic acid (dicamba) and the herbicidal formulation can be formulated so that the herbicidal formulation can be applied at a rate of from about 500 gram to about 950 gram chemical herbicide per acre.

In at least one embodiment, in an aspect, the herbicidally active chemical compound can be 2,4-diclorophenoxyacetic acid (2,4-D), and the weed control composition can be formulated so that the herbicidal formulation can be applied at a rate of from about 100 gram to about 250 gram chemical herbicide per acre.

In at least one embodiment, in an aspect, the herbicidally active chemical compound can be (R,S)-2-amino-4-(hydroxymethyl)phosphonoyl)butanoic acid (glufosinate; phosphinotricin), and the herbicidal formulation can be formulated so that the herbicidal formulation can be applied at a rate of from about 450 gram to about 882 gram chemical herbicide per hectare.

In at least one embodiment, in an aspect, the herbicidally active chemical compound can be met2-{[4-methoxy-6-methyl-1,3,5-triazin-2-yl)amino]-oxomethyl] sulfamoyl}benzoic acid methyl ester (metsulfuron methyl), and the herbicidal formulation can be formulated so that the herbicidal formulation can be applied at a rate of about 0.9 gram to about 3 gram chemical herbicide per acre.

In at least one embodiment, in an aspect, the thiocyanate can be allyl thiocyanate (ATC) or a thiocyanate ion (SCN).

In at least one embodiment, in an aspect, the thiocyanate can be included in the formulation in the form of a hydrolyzed glucosinolate preparation obtained from *Sinapis alba.*

In at least one embodiment, in an aspect, the hydrolyzed glucosinolate preparation can be a plant seed extract obtained from *Sinapis alba.*

In at least one embodiment, in an aspect, the hydrolyzed glucosinolate preparation can be a plant seed meal extract obtained from *Sinapis alba.*

In another aspect, the present disclosure provides a use of a thiocyanate. Accordingly, in one aspect the present disclosure provides, in at least one embodiment, a use of a thiocyanate preparation to prepare an herbicidal formulation to control growth of a weed plant, the herbicidal formulation comprising an herbicidally effective amount of an herbicidally active chemical compound and thiocyanate, together with an herbicidally acceptable diluent, carrier or excipient.

In another aspect, the present disclosure provides a use of a formulation comprising a thiocyanate preparation. Accordingly, in one aspect, the present disclosure provides, in at least one embodiment, a use of an herbicidal formulation comprising an herbicidally effective amount of an herbicidally active chemical compound and thiocyanate to control growth of the weed plant by application of the liquid formulation to a weed plant.

In another aspect, the present disclosure provides, in at least one embodiment, a kit or commercial package for controlling growth of a weed plant comprising:

(a) a first formulation comprising an herbicidally effective amount of an herbicidally active chemical compound;
(b) a second formulation comprising a thiocyanate; and
(c) instructions for the co-application of the first and second formulation to a weed plant to thereby control growth of the weed plant.

In another aspect, the present disclosure provides, in at least one embodiment, a kit or commercial package for controlling growth of a weed plant comprising:

(a) an herbicidal formulation comprising an herbicidally effective amount of an herbicidally active chemical compound and a thiocyanate; and
(b) instructions for the application to a weed plant to thereby control growth of the weed plant.

Other features and advantages of the present disclosure will become apparent from the following detailed description. It should be understood, however, that the detailed description, while indicating preferred embodiments of the disclosure, are given by way of illustration only, since various changes and modifications within the spirit and scope of the disclosure will become apparent to those of skill in the art from the detailed description.

BRIEF DESCRIPTION OF THE DRAWINGS

The disclosure is in the hereinafter provided paragraphs described, by way of example, in relation to the attached figures. The figures provided herein are provided for a better understanding of the example embodiments and to show more clearly how the various embodiments may be carried into effect. The figures are not intended to limit the present disclosure.

DETAILED DESCRIPTION OF THE DISCLOSURE

Figure 1A:
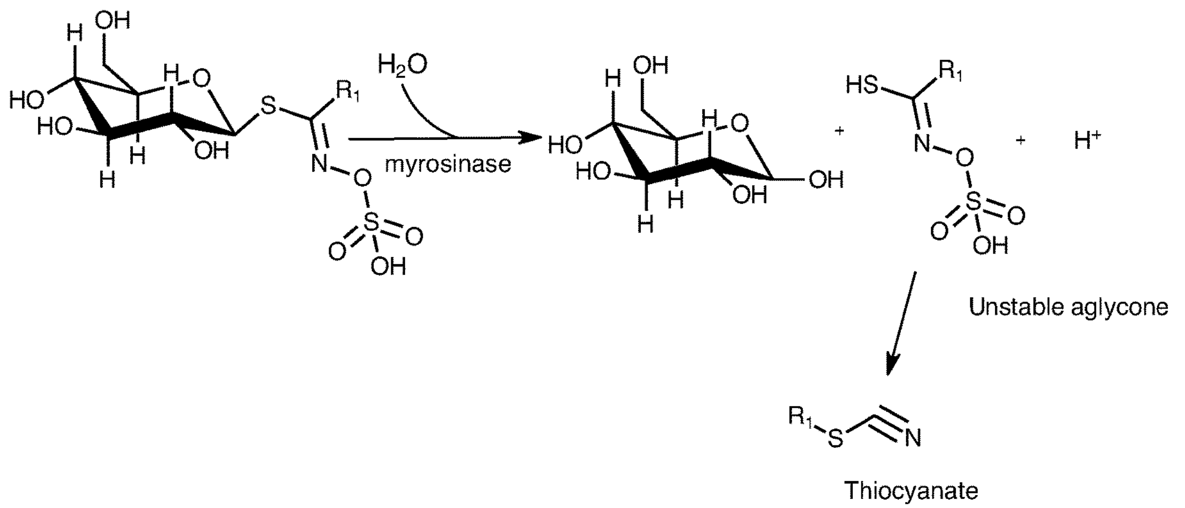
FIGS. 1A-1B are a schematic views of chemical reactions depicting the hydrolysis of glucosinolates yielding a glucosinolate hydrolysate including a thiocyanate (FIG. 1A), and a thiocyanate ion (SCN) (FIG. 1B).

Various methods, compositions or systems will be described below to provide an example of an embodiment of each claimed subject matter. No embodiment described below limits any claimed subject matter and any claimed subject matter may cover methods, compositions or systems that differ from those described below. The claimed subject matter is not limited to methods, compositions or systems having all of the features of any one method, composition or system described below, or to features common to multiple or all of the compositions, systems or processes described below. It is possible that a method, composition or system described below is not an embodiment of any claimed subject matter. Any subject matter disclosed in a method, composition or system described below that is not claimed in this document may be the subject matter of another protective instrument, for example, a continuing patent application, and the applicants, inventors or owners do not intend to abandon, disclaim or dedicate to the public any such subject matter by its disclosure in this document.

As used herein and in the claims, the singular forms, such as “a”, “an” and “the” include the plural reference and vice versa unless the context clearly indicates otherwise. Throughout this specification, unless otherwise indicated, “comprise,” “comprises” and “comprising” are used inclusively rather than exclusively, so that a stated integer or group of integers may include one or more other non-stated integers or groups of integers.

The term “or” is inclusive unless modified, for example, by “either”.

When ranges are used herein, such as for concentrations, for example, all combinations and sub-combinations of ranges and specific implementations therein are intended to be included. Other than in the operating examples, or where otherwise indicated, all numbers expressing quantities of ingredients or reaction conditions used herein should be understood as being modified in all instances by the term “about.” The term “about” when referring to a number or a numerical range means that the number or numerical range being referred to is an approximation within experimental variability (or within statistical experimental error), and thus the number or numerical range may vary between 1% and 15% of the stated number or numerical range, as will be readily recognized by context. Furthermore, any range of values described herein is intended to specifically include the limiting values of the range, and any intermediate value or sub-range within the given range, and all such intermediate values and sub-ranges are individually and specifically disclosed (e.g. a range of 1 to 5 includes 1, 1.5, 2, 2.75, 3, 3.90, 4, and 5). Similarly, other terms of degree such as “substantially” and “approximately” as used herein to modify a term is understood to mean a reasonable amount of deviation of the modified term such that the end result is not significantly changed. These terms of degree should be construed as including a deviation of the modified term if this deviation would not negate the meaning of the term it modifies.

Unless otherwise defined, scientific and technical terms used in connection with the formulations described herein shall have the meanings that are commonly understood by those of ordinary skill in the art. The terminology used herein is for the purpose of describing particular implementations only, and is not intended to limit the scope of the present disclosure, which is defined solely by the claims.

All publications, patents and patent applications are herein incorporated by reference in their entirety to the same extent as if each individual publication, patent or patent application was specifically and individually indicated to be incorporated by reference in its entirety.

Definitions

The term “thiocyanate”, as used herein, refers to a class of chemical compounds having the chemical structure:

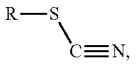

wherein —R is any side group —$R_1$ of a glucosinolate, or wherein —R is an electron pair. The term thiocyanate further includes salts thereof, such as, for example, a potassium salt, an ammonium salt or a guanidine salt, including notably when —R is an electron pair.

The term "glucosinolate", as used herein, refers to a class of chemical compounds having the chemical structure:

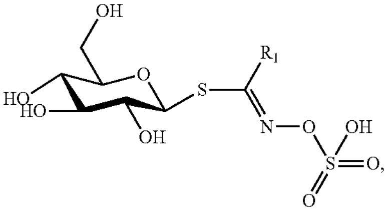

wherein, upon hydrolysis thereof, a thiocyanate can be formed, and includes any glucosinolate compound wherein —$R_1$ can be selected from any one of:

(I)

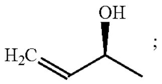

(II)

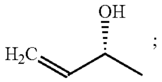

(III)

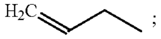

(IV)

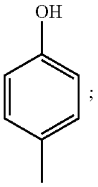

(V)

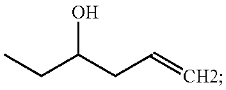

(VI)

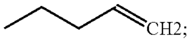

(VII)

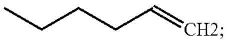

(VIII)

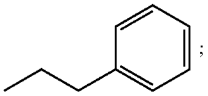

(IX)

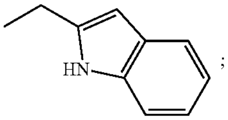

-continued (X)

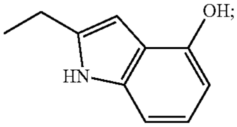

(XI)

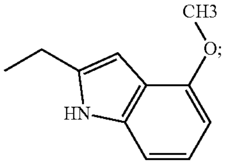

(XII)

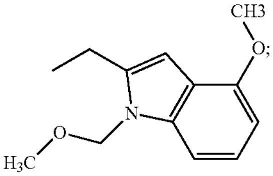

(XIII)

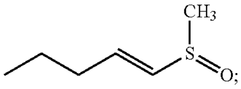

(XIV)

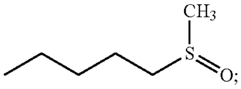

(XV)

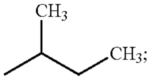

(XVI)

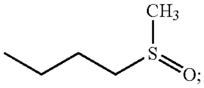

(XVII)

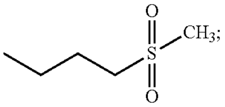

(XVIII)

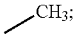

(XIX)

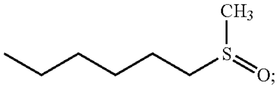

(XX)

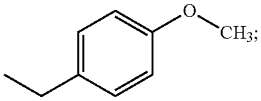

(XXI)

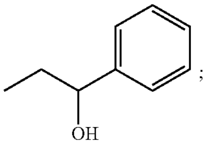

(XXII)

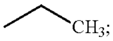

-continued (XXIII)

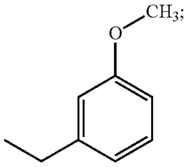

(XXIV)

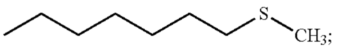

(XXV)

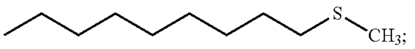

(XXVI)

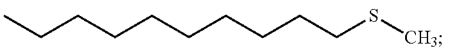

or (XXVII)

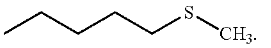

It is noted that the corresponding glucosinolates are also known as: progoitrin (I); epiprogoitrin (II); sinigrin (III); sinalbin (IV); gluconapolieferin (V); gluconapin (VI); glucobrassicanapin (VII); gluconasturtiin (VIII); glucobrassicin (IX); 4-hydroxyglucobrassicin (X); 4-methoxy-glucobrassicin (XI); neoglucobrassicin (XII); glucoraphenin (XIII); glucoraphanin (XIV); glucochlearin (XV); glucoiberverin (XVI); glucocheirolin (XVII); glucoapparin (XVIII); glucoalyssin (XIX); glucoaubrietin (XX); glucobarbarin (XXI); glucolepidin (XXII); glucolimnantin (XXIII); glucolesquerlin (XXIV); glucojirsutin (XXV); glucoarabin (XXVI); and glucoerucin (XXVII), respectively.

The terms "allyl thiocyanate", or "ATC", as may be used interchangeably herein, refer to the chemical compound having the chemical structure:

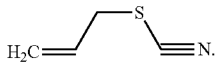

The terms "thiocyanate ion", or "SCN", as may be used interchangeably herein, refer to the chemical compound having the chemical structure:

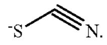

The term further includes salts thereof, such as a potassium salt, an ammonium salt, or a guanidine salt, for example.

Figure 2A:
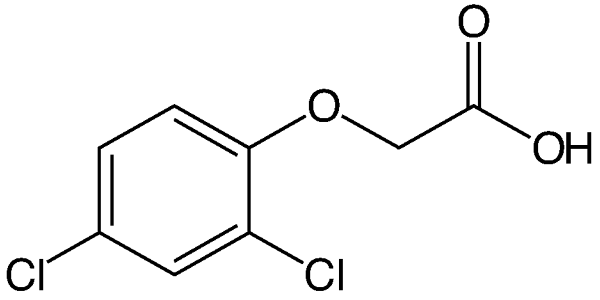
FIG. 2 shows certain organocarboxy compounds, notably 2,4-diclorophenoxyacetic acid (FIG. 2A), 3,6-dichloro-2-methoxybenzoic acid (FIG. 2B), N-(phosphomethyl)glycine (FIG. 2C), (R,S)-2-amino-4-(hydroxymethyl)phosphonoyl) butanoic acid (FIG. 2D), and met2-{[4-methoxy-6-methyl-1,3,5-triazin-2-yl)amino]-oxomethyl]sulfamoyl}benzoic acid methyl ester (FIG. 2E).

The term "2,4-diclorophenoxyacetic acid" as used herein, refers to the chemical compound shown in FIG. 2A. It is noted that 2,4-diclorophenoxyacetic acid may occur in the form of a salt, including an herbicidally acceptable salt e.g. an ammonium salt, a potassium salt, s sodium salt etc. It is further noted that 2,4-diclorophenoxyacetic acid is also known to the art as 2,4-D, and is further included in commercially available herbicidal formulations, sold, for example, under the trademark Trimec® (Trimec is a registered trademark of PBI-Gordon Corporation, Shawnee, Kansas, USA)

Figure 2B:
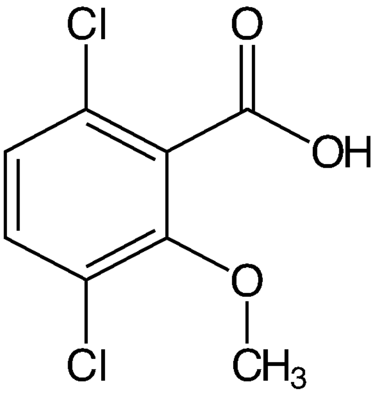

The term "3,6-dichloro-2-methoxybenzoic acid", as used herein, refers to the chemical compound shown in FIG. 2B. It is noted that 3,6-dichloro-2-methoxybenzoic acid may occur in the form of a salt, including an herbicidally acceptable salt e.g. an ammonium salt, a potassium salt, or a sodium salt etc. It is further noted that 3,6-dichloro-2-methoxybenzoic acid is also known to the art as dicamba, and is further included in commercially available herbicidal formulations, and sold, for example, under the trademark Banvel® (Banvel is a registered trademark of BASF Corporation, Florham Park, New Jersey, USA).

Figure 2C:
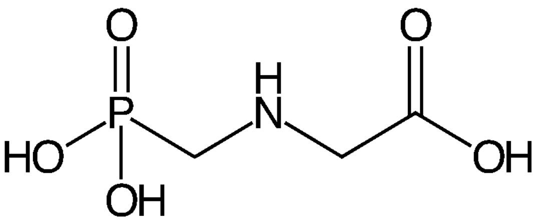

The term "N-(phosphomethyl)glycine", as used herein, refers to the chemical compound shown in FIG. 2C. It is noted that N-(phosphomethyl)glycine may occur in the form of a salt, including an herbicidally acceptable salt e.g. an ammonium salt, a potassium salt, a sodium salt etc. It is further noted that N-(phosphomethyl)glycine is also known to the art as glyphosate, and is further included in commercially available herbicidal formulations, and sold, for example, under the trademark RoundUp® (Roundup is a registered trademark of Monsanto Technology LLC, St. Louis, Missouri, USA).

Figure 2D:
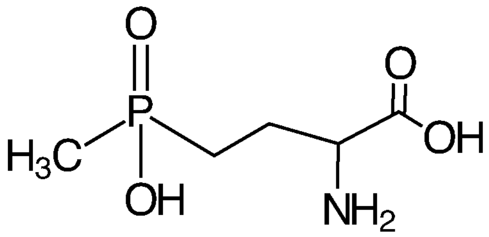

The term "(R,S)-2-amino-4-(hydroxymethyl)phosphonoyl)butanoic acid", as used herein, refers to the chemical compound shown in FIG. 2D. It is noted that (R,S)-2-amino-4-(hydroxymethyl)phosphonoyl)butanoic acid may occur in the form of a salt, including an herbicidally acceptable salt e.g. an ammonium salt, a potassium salt, a sodium salt etc. It is further noted that (R,S)-2-amino-4-(hydroxymethyl) phosphonoyl)butanoic acid is also known to the art as glufosinate, phosphinotricin and PPT, and is further included in commercially available herbicidal formulations, and sold, for example, under the trademark Liberty® (Liberty is a registered trademark of BASF SE Societas Europeae, Ludwigshafen, Germany).

Figure 2E:
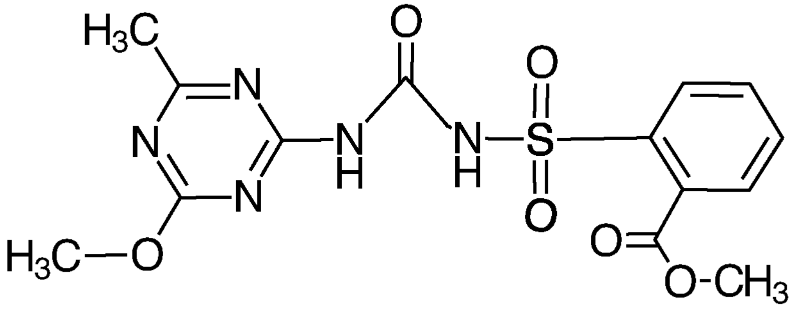

The term "met2-{[4-methoxy-6-methyl-1,3,5-triazin-2-yl)amino]-oxomethyl]sulfamoyl}benzoic acid methyl ester", as used herein, refers to the chemical compound shown in FIG. 2E. It is noted that met2-{[4-methoxy-6-methyl-1,3,5-triazin-2-yl)amino]-oxomethyl] sulfamoyl}benzoic acid methyl ester may occur in protonated, free acid form, or in deprotonated, salt form, wherein the sulfonylurea bridge —$S(O)_2NHC(=O)N$— is deprotonated. When in deprotonated form, may occur in a salt form, for example a phosphonium salt. It is further noted that met2-{[4-methoxy-6-methyl-1,3,5-triazin-2-yl)amino]-oxomethyl]sulfamoyl}benzoic acid methyl ester is also known to the art as metsulfuron methyl, and is further included in commercially available herbicidal formulations, and sold, for example, under the trademark Ally® (Ally is a registered trademark of FMC Agricultural Caribe Industries, LTD Hamilton, Bermuda).

The expression "herbicidally effective amount", as used herein, refers to any amount that results in the retardation or stunting of growth of a weed plant for a limited or prolonged period of time, and further includes any amount that is lethal to the weed plant.

The term "herbicidally acceptable", as used herein, refers to materials, including, without limitation, carriers, diluents, or excipients, that are compatible with other materials in an herbicidal formulation and which within the scope of reasonable judgement, are suitable for use in herbicidal formulations, without excessive risks to humans or the environment, or other adverse effects, commensurate with a reasonable risk/benefit ratio.

The phrase "controlling growth of a weed plant", as used herein, means that the growth of the weed plant is reduced, retarded or stunted compared to the growth in the absence of an herbicidal formulation, and includes the killing of the weed plant.

The term "cultivated plant", as used herein, refers to a plant one chooses to grow for any agricultural or horticultural purposes.

The terms "weed" and "weed plant", as may be used interchangeably herein, refer to a plant whose growth is deemed undesirable, especially in the proximity of a weed plant.

The terms "co-apply", "co-applied" or "co-application", as used herein in relation to the control of the growth of a weed plant in the proximity of a cultivated plant, are intended to mean the simultaneous or sequential application of a first and second formulation, including, for example, a first formulation comprising a chemical herbicidal compound and a second formulation comprising a thiocyanate, wherein the cultivated plant benefits in a fashion superior to the anticipated additive effectiveness of the application of the a first and second liquid formulation. The terms "co-apply", "co-applied" or "co-application" further also include the application of a single formulation wherein a first and second formulation have been combined.

The term "substantially pure", as used herein, in relation to a chemical substance refers to a preparation of such substance in which the substance has been separated from components that naturally accompany it. Typically, a chemical substance is substantially pure when at least 60%, more preferably, at least 75%, at least 80%, at least 90%, at least 95%, at least 96%, at least 97%, at least 98%, or at least 99% (by volume, by wet or dry weight, or by mole percent or fraction) in a sample is the compound of interest. Purity can be measured by any appropriate technique, e.g. gas chromatography (GC), or high performance liquid chromatography (HPLC).

General Implementation

As hereinbefore mentioned, the present disclosure relates to methods and compositions for controlling weed growth. The methods and compositions of the present disclosure permit the retardation of growth of weed plants, or can be lethal to weed plants. One attractive feature of the present disclosure is that the compositions and methods limit the required quantities of herbicidally active compounds to control weed growth. In particular, it has been discovered that herbicidally active chemical compounds, including organocarboxy compounds, can be co-applied with a thiocyanate compound, and that, surprisingly, when herbicidally active chemical compounds are co-applied with thiocyanate compounds, the amount of herbicidally active compound required may be substantially lower than the amount of herbicidally active in conventional herbicidal formulations comprising herbicidal actives. Thus, the methods and compositions of the present disclosure can allow for a reduction in use of herbicidal chemical actives, including, for example, glyphosate. It is a further advantage of the methods of the present disclosure that the thiocyanate compounds can be obtained in the form of natural extracts.

In accordance herewith, in one aspect, the present disclosure provides, in at least one example embodiment, in accordance with the teachings herein a method for controlling growth of a weed plant, the method comprising co-applying an herbicidally effective amount of an herbicidally active chemical compound and an herbicidally effective amount of a thiocyanate to a weed plant to thereby control growth of the weed plant.

In order to practice the methods of the present disclosure, in an aspect hereof, an herbicidally active chemical compound and a thiocyanate are provided, prepared or obtained. Generally, these compounds can be provided, prepared or obtained in substantially pure form (e.g. 95% or more than 95% pure, 96% or more than 96% pure, 97% or more than 97% pure, 98% or more than 98% pure, 99% or more than 99% pure), or in the form of a formulation, for example, a liquid formulation, comprising herbicidally effective amounts of these compounds, wherein the formulation further comprises, for example, a herbicidally acceptable diluent, carrier or excipient.

Thus, in one aspect, a first formulation comprising a herbicidally effective amount of a herbicidally active chemical compound can be provided and a second formulation comprising a herbicidally effective amount of a thiocyanate can be provided. The first and second formulation can then be co-applied to a weed plant either sequentially or simultaneously.

In another aspect, an herbicidally active chemical compound can be provided and a thiocyanate can be provided. The herbicidally active chemical compound and the thiocyanate can be co-formulated to form a single co-formulated herbicidal formulation. The co-formulated herbicidal formulation can then be applied to a weed.

Thus, in order to practice the methods of the present disclosure in an aspect hereof, an herbicidally active chemical compound or a thiocyanate, or formulations comprising a herbicidally active chemical compound and/or a thiocyanate provided, obtained or prepared. Next, example herbicidally active chemical compounds and example thiocyanates will be discussed.

The herbicidally active chemical compound can be any chemical compound, other than thiocyanate, capable of controlling the growth of a weed plant, when applied in an herbicidally effective amount.

In at least one embodiment, the herbicidally active compound can be an organocarboxy compound.

Herbicidally active organocarboxy compounds are generally known to the art and include, for example, 2,4-diclorophenoxyacetic acid, 3,6-dichloro-2-methoxybenzoic acid, (R,S)-2-amino-4-(hydroxymethyl)phosphonoyl)butanoic acid, and N-(phosphomethyl)glycine. The organocarboxy compound may be provided in the form of an herbicidally acceptable salt, for example an ammonium salt, a potassium salt, a sodium salt, dimethylamine salt, and the like. Furthermore, the organocarboxy compound may be provided in solid crystalline formulation, or in liquid formulation, for example, as an aqueous salt solution, including, for example a 2,4-diclorophenoxyacetic acid salt solution, 3,6-dichloro-2-methoxybenzoic acid salt solution, (R,S)-2-amino-4-(hydroxymethyl)phosphonoyl)butanoic acid salt solution, or a N-(phosphomethyl)glycine salt solution. Thus, for example, N-(phosphomethyl)glycine may be provided as an N-(phosphomethyl)glycine ammonium salt, or as a dimethylamine salt, either in crystalline form or as a salt solution. The organocarboxy compound 3,6-dichloro-2-methoxybenzoic acid may be provided as a dimethylamine salt, sodium salt, diglycoamine salt, isopropylamine salt or a potassium salt, either in crystalline form, or as a salt solution. The organocarboxy compound 2,4-diclorophenoxyacetic acid may be provided as a sodium salt or as a dimethylamine salt, either in crystalline form or as a salt solution. The organocarboxy compound (R,S)-2-amino-4-(hydroxymethyl)phosphonoyl)butanoic acid may be provided as an ammonium salt or a sodium salt, either in crystalline form or as a salt solution. Moreover, the organocarboxy compound may be provided in a more or less pure form, or in a substantially pure form, and the organocarboxy compound may for example, be at least about 95% (w/w)

pure, at least about 96% (w/w) pure, at least about 97% (w/w) pure, at least about 98% (w/w) pure, or at least about 99% pure.

In a further embodiment, the herbicidally active chemical compound may be met2-{[4-methoxy-6-methyl-1,3,5-triazin-2-yl)amino]-oxomethyl]sulfamoyl}benzoic acid methyl ester. The chemical compound met2-{[4-methoxy-6-methyl-1,3,5-triazin-2-yl)amino]-oxomethyl] sulfamoyl}benzoic acid methyl ester may be provided in protonated or deprotonated form. When provided in deprotonated form, the compound may be provided the form of an herbicidally acceptable salt, for example, a phosphonium salt. Furthermore, met2-{[4-methoxy-6-methyl-1,3,5-triazin-2-yl)amino]-oxomethyl]sulfamoyl}benzoic acid methyl ester may be provided in solid crystalline formulation, or in liquid formulation, for example, as an organic solution or an aqueous salt solution. Moreover, the met2-{[4-methoxy-6-methyl-1,3,5-triazin-2-yl)amino]-oxomethyl] sulfamoyl}benzoic acid methyl ester may be provided in a more or less pure form, or in a substantially pure form, and the met2-{[4-methoxy-6-methyl-1,3,5-triazin-2-yl)amino]-oxomethyl]sulfamoyl}benzoic acid methyl ester compound may for example, be at least about 95% (w/w) pure, at least about 96% (w/w) pure, at least about 97% (w/w) pure, at least about 98% (w/w) pure, or at least about 99% pure.

Figure 1B:
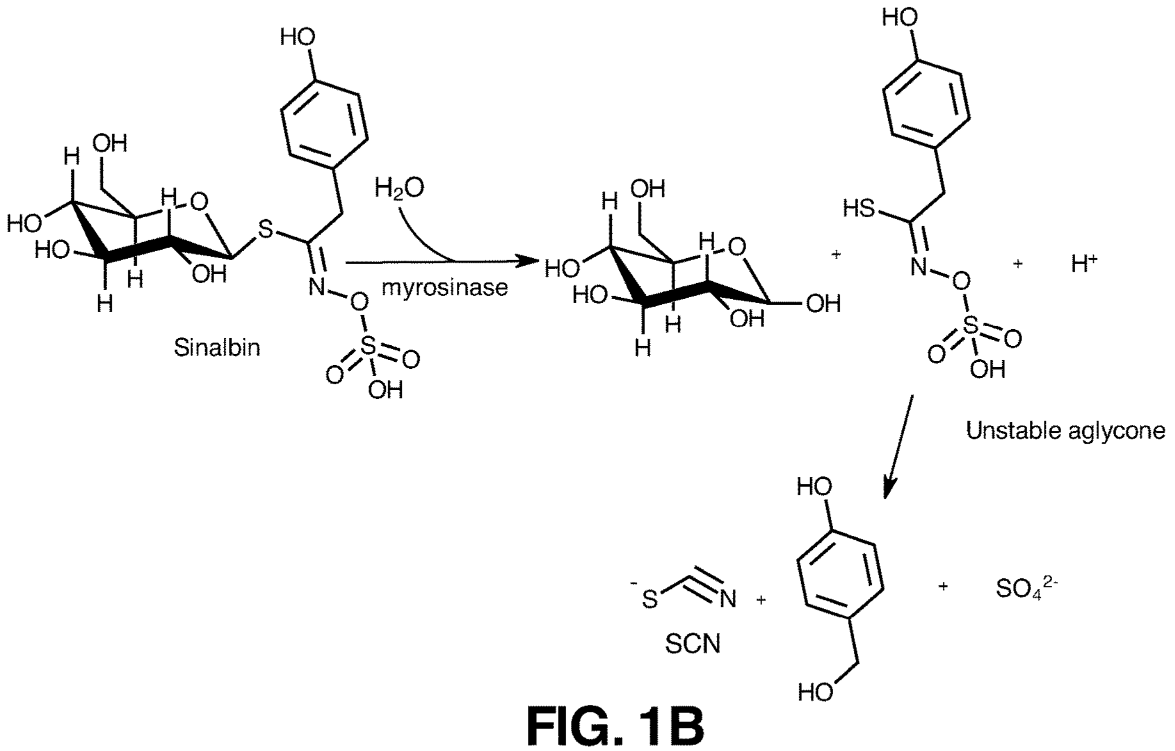

It is noted that the herbicidally active compound may be prepared and synthesized chemically, by referring to their chemical formulas, such as provided in for example, FIGS. 2A-2E, or the herbicidally active compound may be obtained, for example, by purchasing a formulation comprising the herbicidally active compound from a manufacturer or distributor selling herbicidal formulations. It is noted in this respect that, for example, a formulation comprising 2,4-diclorophenoxyacetic acid, 3,6-dichloro-2-methoxybenzoic acid, (R,S)-2-amino-4-(hydroxymethyl) phosphonoyl)butanoic acid, N-(phosphomethyl)glycine, and met2-{[4-methoxy-6-methyl-1,3,5-triazin-2-yl)amino]-oxomethyl]sulfamoyl}benzoic acid methyl ester may be purchased, for example, under the trade names Trimec®, Banvel®, Liberty®, RoundUp®, and Ally®, respectively Turning now to thiocyanate compounds, it is noted that thiocyanates are also known to the art. Thiocyanate preparations, in accordance, with an aspect hereof can be prepared, by obtaining a glucosinolate preparation from *Sinapis alba* plants and hydrolyzing the glucosinolate constituents therein to obtain a glucosinolate hydrolysate comprising thiocyanate compounds. Alternatively, thiocyanate preparations may be purchased from a fine chemical manufacturer, such as Sigma-Aldrich®, for example. The pertinent glucosinolate hydrolysis reaction can be represented as shown in FIGS. 1A-1B. It is noted that the hydrolysis reaction can be catalyzed by an enzyme known as myrosinase, as hereinafter further discussed.

Thus, in an aspect, in at least one embodiment, a thiocyanate preparation can be obtained by isolation thereof from *Sinapis alba* plants.

A thiocyanate preparation may be obtained by comminuting *Sinapis alba* plants, plant parts, plant portions or plant material containing glucosinolates, or mixtures thereof, which may optionally be prepared or cleaned, for example, dried to remove moisture, or washed to remove extraneous materials, such as soil materials, or certain plant components, such as seed husks or hulls. Plant parts, plant portions and plant material that may be used as a source material include, but are not limited to, *Sinapis alba* plant seeds, stems, roots or leaves obtainable from *Sinapis alba* plants. *Sinapis alba* seeds in this respect are particularly preferred in view of the substantial concentrations of glucosinolates capable of being hydrolyzed to form thiocyanates, present therein. Comminution of plant material may be achieved using comminution equipment, for example, a grinder, blender, or mill or another device capable of substantially fragmenting the plant material. Operating conditions are generally selected such that plant tissue is fragmented to a degree to which plant cell walls lose integrity and rupture.

In at least one embodiment, seed fractions, such as a *Sinapis alba* seed meal, including a de-oiled or partially de-oiled seed meal, for example, can be used as the source material from which a glucosinolate preparation may be prepared. Such a de-oiled pr partially de-oiled *Sinapis alba* meal may be prepared by subjecting plant seeds to solvent extraction, hydraulic pressing, expeller pressing, cold pressing, or a combination thereof, or other oil removal techniques, which will be known to those of skill in the art, in order to obtain a de-oiled or defatted plant meal. The thus obtained seed fraction can then be used as a starting material to prepare a glucosinolate preparation.

Comminution of *Sinapis alba* plant material may be performed in the presence of water or another aqueous extractant, including an aqueous buffer, or a lower alcohol, for example, a $C_1$-$C_4$ alcohol, or a lower ketone, for example a $C_3$-$C_4$ ketone, or mixtures thereof. Glucosinolates will readily dissolve in such aqueous extractants. The ratio of plant material to extractant can be selected to be less than about 1:100 (w/v), more preferably, for example about 1:10 (w/v). Comminution can be performed at temperatures between 4° C. or about 4° C. and 65° C. or about 65° C., and preferably between 18° C. or about 18° C., and 65° C. or about 65° C., and preferably between about 50° C. and about 60° C. In other embodiments, comminution is performed in the absence of an extractant, and the extractant is mixed with the comminuted plant material. The plant material and extractant may be agitated and/or mixed for a period of time, varying from, for example, about 1 hour to about 12 hours, preferably at temperatures ranging from between about 50° C. and about 60° C. Under these conditions myrosinase can hydrolyze the *Sinapis alba* glucosinolates to form thiocyanates, including, for example, a thiocyanate ion (SCN) (see: FIG. 1B), and thus, under these conditions a *Sinapis alba* glucosinolate hydrolysate comprising thiocyanates can be obtained. Subsequently, the solid comminuted *Sinapis alba* plant material, including fibrous plant material non-soluble proteins and other non-soluble plant constituents, can be separated from the liquid fraction. Such separation may be achieved using separation equipment, including but not limited to decantation equipment, centrifugation equipment, or filtration equipment or other equipment suitable for the separation of the liquid fraction from the solid plant material. The thus obtained liquid fraction is a glucosinolate preparation that may be used in accordance herewith.

In at least one embodiment, upon having obtained the liquid fraction, the extraction/separation step may be repeated one or more times, in order to achieve further removal of further solid plant material. In addition, the solid plant material may be extracted two or more times, in order to improve the yield. Centrifugation may additionally be used to separate plant oils, in embodiments where the comminuted plant material comprises plant oils, such as plant seed oils, from the aqueous fraction.

In at least one embodiment, the glucosinolates and/or thiocyanates present in the liquid fraction may be concentrated and separated from other plant constituents present in the liquid fraction, using, for example, evaporation of the extractant and/or filtration, through, for example, one or more ion-exchange filtration steps, or through nano-filtration, to obtain a more purified concentrate, for example, a substantially pure glucosinolate preparation, or, as hereinafter described, a substantially pure hydrolyzed glucosinolate preparation can be obtained.

Referring again to FIGS. 1A-1B, the enzyme myrosinase can catalyze the conversion of glucosinolates to obtain a glucosinolate hydrolysate comprising glucose, unstable aglycone, and thiocyanate compounds (FIG. 1A), including a thiocyanate ion (SCN) from sinalbin (FIG. 1B). *Sinapis alba* plants containing glucosinolates, including, for example, sinalbin, also contain myrosinase. However, glucosinolates are generally stable in vivo in plant cells, since myrosinase is stored in a different intracellular compartment, or in different plant cells. The hydrolysis reaction can be initiated during the comminution step when cell walls are broken and glucosinolates and myrosinase come into contact with one another. Thus, the thiocyanate compounds can be formed during the comminution and extraction process.

It is noted that the degree to which the hydrolysis reaction proceeds can be controlled by controlling the temperature at which the comminution and extraction/separation steps are conducted. Thus, for example, by conducting these steps, at for example, about 4° C., the obtained glucosinolate preparation may contain predominantly intact glucosinolates. The thus obtained glucosinolate concentrate may be freeze-dried, or spray dried in order to obtain a substantially dry glucosinolate concentrate, or the preparation may be stored in liquid form at, for example, about 4° C. Concentrations of glucosinolate in the preparation may vary from about 5% to about 100%, preferably 5%-80%, and most preferably 5%-50%. At a later stage, the preparation may be obtained and the hydrolysis reaction may be conducted by ensuring sufficient quantities of water or an aqueous buffer are present and the temperature of the preparation is brought up to, for example, from about 18° C. to about 40° C.

In other embodiments, the *Sinapis alba* plant material is comminuted, extracted, separated, and, optionally, further extracted, at temperatures from about 18° C. to about 60° C., and preferably from about 50° C. to about 60° C., at which temperatures, the glucosinolate constituents in the glucosinolate preparation will undergo hydrolysis during these steps, and a glucosinolate hydrolysate comprising thiocyanate compounds is obtained.

In the obtained *Sinapis alba* glucosinolate hydrolysate, at least about 50%, about 60%, about 70%, about 80%, about 90%, about 95%, or about 99% of the glucosinolate constituents is hydrolyzed. The obtained glucosinolate hydrolysate can comprise from about 1 mg/ml to about 50 mg/ml thiocyanate. The thiocyanate compounds that may be present in a glucosinolate hydrolysate in accordance with the present disclosure include allyl thiocyanate (ATC) and a thiocyanate ion (SCN). It is noted, that the glucosinolate hydrolysate, in addition to one or more thiocyanate compounds, may contain other constituents, including additional hydrolysis products, such as glucose, aglycones, for example. Thus, in at least one embodiment, the thiocyanate preparation of the present disclosure can be a mixture comprising two or more thiocyanate compounds, including for example ATC and SCN.

In at least one embodiment, the *Sinapis alba* glucosinolate hydrolysate may be used to extract thiocyanate compounds to obtain a more or less pure thiocyanate preparation from which myrosinase, and non-thiocyanate hydrolysis products, such as glucose, and aglycone products have been removed to obtain a substantially pure thiocyanate preparation. Such more or less pure preparations may be obtained using, for example, chromatographic techniques.

Analytical techniques to quantify glucosinolates, glucosinolate hydrolysis, and glucosinolate hydrolysis products are known to the art and include, for example, enzymatic assays in which a glucosinolate preparation is subjected to hydrolysis using commercially obtained myrosinase. The formed glucose can in turn be converted by hexokinase and glucose-6-phosphate dehydrogenase, which results in the production on nicotine adenine dinucleotide phosphate (NADPH), which be detected spectrophotometrically at 340 nm or 520 nm. Furthermore, gas-chromatography techniques and high performance liquid chromatography techniques may also be used to quantify glucosinolates, glucosinolate hydrolysis and glucosinolate hydrolysis products, as further described, for example, in the European Food Safety Authority Journal, 2008, 590: 1-76.

Thus, to briefly recap, an herbicidally active chemical compound and a thiocyanate may be provided, obtained or prepared in more or less pure form. The thiocyanate compound may be prepared from plant materials obtained from *Sinapis alba*. A *Sinapis alba* glucosinolate preparation may be obtained and subjected to conditions permitting hydrolysis of the glucosinolate constituents of the preparation to thereby obtain a glucosinolate hydrolysate. The *Sinapis alba* glucosinolate hydrolysate may be used as a thiocyanate preparation, or it may be used to extract thiocyanate.

Turning now to the preparation of a formulation comprising an herbicidally active compound, a formulation comprising a thiocyanate, and an herbicidal formulation comprising both an herbicidally active chemical compound and a thiocyanate compound. In general, the thiocyanate and/or herbicidally active compound may be contacted with other ingredients to form a formulation comprising an herbicidally active chemical compound and/or a thiocyanate. Other ingredients that may be included in the formulations include at least one of a diluent, carrier or excipient. Suitable diluents include water, a buffer, an alcohol, water soluble polyols (e.g. glycol, glycerine, glycerol, diglycerin, triglycerin, polyglycerin), or a vegetable oil. Suitable excipients that may be included in the liquid formulation include surface active agents, pH-modifying agents (acids, bases, buffers), salts, anti-foaming agents, humidifying agents, penetrating agents, adherence agents, wetting agents, odorants, viscosity modifiers, co-herbicides (including, without limitation, any of the herbicides set forth in the present disclosure), pesticides (including, for example, insecticides or fungicides, and further including, without limitation, any of the pesticides set forth in this disclosure), pigments, anti-freeze agents, preservatives, and process aids. Suitable carriers that that may be included in the liquid formulation include solid carriers such as, silicas, diatomaceous earth, chalk or clay. The order of addition of the ingredients may be varied and is generally not critical, however, it may be beneficial to initially mix the thiocyanate preparation with a diluent and the herbicidally active chemical compound with a diluent, and thereafter add the other ingredients.

The thiocyanate preparation, and/or herbicidally active compound can be contacted with each other and other suitable ingredients, in a suitable mixing vessel with agitation, such as a mechanical blender or mixer, or other suitable device producing sufficient circulation or agitation to thoroughly mix the ingredients. In particular, if the herbicidally active chemical compound and/or thiocyanate are both provided in solid or crystalline form, a diluent is preferably included to prepare a liquid formulation comprising the herbicidally active chemical compound and/or the thiocyanate. Mixing conditions, such as time and temperature, can be adjusted, but are generally selected to dissolve or suspend the herbicidally active chemical compound and/or thiocyanate and obtain a homogenous liquid formulation. In general, mixing can be performed at ambient conditions.

It is noted that in embodiments hereof where a less pure glucosinolate preparation, such as a *Sinapis alba* glucosinolate extract, is used the non-glucosinolate constituents in the preparation may impart some of the properties of the above noted ingredients. Thus, for example, certain endogenous sugars may be retained in a glucosinolate preparation, and may facilitate adherence of the formulation to the plant foliar tissue.

In accordance herewith, the herbicidal formulation contains an herbicidally effective amount of an herbicidally active chemical compound. Such formulation can be prepared by including a desired amount of the chemical compound and/or a desired amount of the thiocyanate, and concentrations may range substantially depending on the chemical compound.

With respect to the concentration of thiocyanate included in a herbicidal formulation the final concentration is at least about 0.4 mg/ml thiocyanate and furthermore concentrations may range for example from about 1 mg/ml thiocyanate to about 50 mg/ml thiocyanate, for example 1 mg/ml or about 1 mg/ml, 5 mg/ml or about 5 mg/ml, 10 mg/ml or about 10 mg/ml, 15 mg/ml or about 15 mg/ml, 20 mg/ml or about 20 mg/ml, 25 mg/ml or about 25 mg/ml, 30 mg/ml or about 30 mg/ml, 35 mg/ml or about 35 mg/ml, 40 mg/ml or about 40 mg/ml, 45 mg/ml or about 45 mg/ml, or 50 mg/ml or about 50 mg/ml.

It is noted that the foregoing concentrations represent final concentrations of a finished formulation, i.e. concentrations of a formulation which is suitable for direct use as an herbicide. It will be understood, that additionally concentrated formulations comprising higher concentrations of the herbicidally active compound and thiocyanate may be prepared, which then may be diluted prior to use as an herbicide. Such concentrated formulations may be desirable to facilitate transport and storage.

In another aspect, the present disclosure provides, in at least one embodiment, an herbicidal formulation comprising a herbicidally active chemical compound, such as an organocarboxy compound, and a thiocyanate, wherein the formulations are formulated to allow for a herbicide application rate wherein the relative dry weight of applied thiocyanate to the applied dry weight of the herbicidally active chemically active compound can range from 0.05:1 to 5,000:1, including, for example, from 0.5:1 to 5,000:1, or from 5:1 to 5,000:1, or from 50:1 to 5,000:1, or from 500:1 to 5,000:1. Thus, by way of example, when the thiocyanate is formulated in a formulation in a range of from 25 gram per acre to 25 kg per acre, a formulation for co-application comprising a herbicidally active chemical compound can be formulated to allow for application of the herbicidally active compound of from 5 gram per acre to 500 gram per acre. Further examples are shown in Table 1.

TABLE 1

| Example Relative concentrations of thiocyanate and herbicidally active chemical compound | |
|---|---|
| Thiocyanate application rate | Herbicidally active compound application ratio |
| 25 gram-25 kilogram/acre | 0.05:1-5,000:1 |
| 100 gram-25 kilogram/acre | 0.2:1-5,000:1 |
| 250 gram-25 kilogram/acre | 0.5:1-5,000:1 |
| 1 kilogram-25 kilogram/acre | 2:1-5,000:1 |
| 2.5 kilogram-25 kilogram/acre | 5:1-5,000:1 |
| 25 gram-20 kilogram/acre | 0.05:1-4,000:1 |
| 100 gram-20 kilogram/acre | 0.2:1-4,000:1 |
| 250 gram-20 kilogram/acre | 0.5:1-4,000:1 |
| 1 kilogram-20 kilogram/acre | 2:1-4,000:1 |
| 2.5 kilogram-20 kilogram/acre | 5:1-4,000:1 |
| 25 kilogram/acre | 50:1-5,000:1 (e.g. 100:1-5,000:1; or 500:1-5,000:1; or 1,000:1-2,500:1) |
| 10 kilogram/acre | 20:1-2,000:1 (e.g. (100:1-2,000:1; or 500:1-2,000:1; or 500:1-1,000:1) |

In at least one embodiment, the herbicidally active chemical compound can be included in the herbicidal formulation in an amount which is at least about 33% (w/w) lower than the amount included in the herbicidal formulation if the chemical herbicide was included in an herbicidal formulation for sole application to control weed plants.

In at least one embodiment, the herbicidally active chemical compound can be included in the herbicidal formulation in an amount which is at least about 90% (w/w) lower than the amount included in the herbicidal formulation if the chemical herbicide was included in an herbicidal formulation for sole application to control weed plants. Thus, for example, the chemical herbicide can be included in the herbicidal formulation in an amount which 10% (w/w) or about 10% (w/w), 15% (w/w) or about 15% (w/w), 20% (w/w) or about 20% (w/w), 25% (w/w) or about 25% (w/w), 30% (w/w) or about 30% (w/w), 35% (w/w) or about 35% (w/w), 40% (w/w) or about 40% (w/w), 45% (w/w) or about 45% (w/w), 50% (w/w) or about 50% (w/w), 55% (w/w) or about 55% (w/w), 60% (w/w) or about 60% (w/w), 65% (w/w) or about 65% (w/w), 70% (w/w) or about 70% (w/w), 75% (w/w) or about 75% (w/w), 80% (w/w) or about 80% (w/w), 85% (w/w) or about 85% (w/w), or 90% (w/w) or about 90% (w/w) lower than the amount included in the herbicidal formulation if the chemical herbicide was included in an herbicidal formulation for sole application to control weeds.

In another aspect, present disclosure provides, in at least one embodiment, a method of preparing an herbicidal formulation, the method comprising (a) providing an herbicidally effective amount of an herbicidally active chemical compound;
(b) providing a thiocyanate; and
(c) mixing the chemical compound and the thiocyanate together with an herbicidally acceptable diluent, carrier or excipient to form an herbicidal formulation.

In yet another aspect, the present disclosure relates to formulations for weed growth control. Accordingly, the present disclosure provides, in at least one aspect, in at least one embodiment, an herbicidal formulation comprising:

an herbicidally effective amount of an herbicidally active chemical compound and an a thiocyanate, together with an herbicidally acceptable diluent, carrier or excipient.

In accordance herewith, the herbicidal formulations of the present disclosure can be used to control growth of weed plants.

In general, in accordance herewith the formulations can be used when one or more plants are cultivated, and it is deemed undesirable that weed plants grow in the proximity of the cultivated plants. The cultivated plants may be any cultivated plants, including any agricultural or crop plants, or any horticultural plants during any stage of development. Agricultural crops include, without limitation, wheat (*Triticum aestivum*), corn (*Zea mays*), rice (*Oryza sativa*), soybean (*Glycine max*), oilseed rape (*Brassica napus*), sunflower (*Helianthus annuus*), cotton (*Gossypium hirsutum*), peanut (*Arachis hypogaea*), tomato (*Solanum lycopersicum*), and *Cannabis* (*Cannabis sativa*). Furthermore, the cultivated plants may be grown indoor, for example, in greenhouses, or outdoor, and at any scale, including for commercial agricultural or horticultural purposes, or for home and garden use.

The target weed plant may vary depending on, for example, the geographical location and environmental factors prevalent at the growth site of the cultivated plant, as will be readily appreciate by those of skill in the art. The methods of the present disclosure can be used to control growth of a wide variety of weed plants. Example weed plants include, without limitation, the following dicotelydenous plants: velvet leaf (*Abutilon theophrasti*), pigweed (*Amaranthus* spp.), buttonweed (*Borreria* spp.), oilseed rape, Canola, indian mustard, etc. (*Brassica* spp.), *commelina* (*Commelina* spp.), filaree (*Erodium* spp.), sunflower (*Helianthus* spp.), morning glory (*Ipomoea* spp.), *kochia* (*Kochia scoparia*), mallow (*Malva* spp.), wild buckwheat, smartweed, etc. (*Polygonum* spp.), purslane (*Portulaca* spp.), Russian thistle (*Salsola* spp.), *sida* (*Sida* spp.), wild mustard (*Sinapis arvensis*), and cocklebur (*Xanthium* spp.).

Further example weed plants include, without limitation, the following monocotelydenous plants: wild oat (Avena-fatua), carpetgrass (*Axonopus* spp.), downy brome (*Bromus tectorum*), crabgrass (*Digitaria* spp.), barnyard grass (*Echinochloa crusgalli*), goosegrass (*Eleusine indica*), annual ryegrass (*Lolium multiflorum*), rice (*Oryza sativa*), ottochloa (Ottochloa nodosa), bahiagrass (*Paspalum notatum*), canarygrass (*Phalaris* spp.), foxtail (*Setaria* spp.), wheat (*Triticum aestivum*) and corn (*Zea mays*).

Further example weed plants include, without limitation, the following perennial dicotyledonous plants: mugwort (*Artemisia* spp.), milkweed (*Asclepias* spp.), Canada thistle (*Cirsium arvense*), field bindweed (*Convolvulus arvensis*) and kudzu (*Pueraria* spp.).

Further example weed plants include, without limitation, the following perennial monocotelydenous plants: *brachiaria* (*Brachiaria* spp.), bermudagrass (*Cynodon dactylon*), quackgrass (Elymus *repens*), lalang (*Imperata cylindrica*), perennial ryegrass (*Lolium perenne*), guineagrass (*Panicum maximum*), dallisgrass (*Paspalum dilatatum*), reed (*Phragmites* spp.), johnsongrass (*Sorghum halepense*) and cattail (Typha spp.).

Yet, other perennial weed plant species include, without limitation, horsetail (*Equisetum* spp.), bracken (*Pteridium aquilinum*), blackberry (*Rubus* spp.), dandelion (*Taraxacum officinale*), and gorse (*Ulex europaeus*).

The formulations of the present disclosure may be applied at any stage of development of the weed plant, including prior to or after the emergence of weed foliage, for example, within two or three days of the first visibly observable weed plant foliage, or at a stage when weed plants exhibit more mature weed plant foliage, for example, when weed plants exhibit at least 1 week, at least 2 weeks, at least 3, weeks, or at least 4 weeks old weed foliage. The application concentrations and frequency may be varied and may depend on for example, the desired degree of growth control, the age and species of weed plant one desires to control, weather and other conditions prevalent at the site of application. In general, application frequency may vary from a single application to a daily, weekly or monthly application.

The herbicidal formulations of the present disclosure can be prepared to be as efficacious as a conventional herbicidal formulation comprising only the chemical herbicide, and not including thiocyanate, however, the herbicidal formulations and application methods of the present disclosure require lower amounts of the chemical herbicide to achieve the same herbicidal efficacy.

In at least one embodiment, the herbicidally active compound can be N-(phosphomethyl)glycine (glyphosate), and a herbicidal formulation can be formulated so that the herbicidally active compound can be co-applied with a thiocyanate (either each in a separate formulation or both together in a co-formulation including the herbicidally active compound and the thiocyanate), at a rate of from about 5 gram to about 550 gram glyphosate per acre, including, for example, from about 50 gram to about 500 gram per acre, from about 50 gram to about 450 gram per acre, from about 50 gram to about 400 gram per acre, from about 50 gram to about 350 gram per acre, from about 50 gram to about 300 gram per acre, from about 50 gram to about 250 gram per acre, from about 50 gram to about 200 gram per acre, from about 50 gram to about 150 gram per acre, or 100 gram to about 500 gram per acre, from about 100 gram to about 450 gram per acre, from about 100 gram to about 400 gram per acre, from about 100 gram to about 350 gram per acre, from about 100 gram to about 300 gram per acre, from about 100 gram to about 250 gram per acre, from about 100 gram to about 200 gram per acre, or from about 100 gram to about 150 gram per acre.

In some embodiments, glyphosate can be applied at for example, 5 gram or about 5 gram per acre, 25 gram or about 25 gram per acre, 50 or about 50 gram per acre, 100 or about 100 gram per acre, 150 or about 150 gram per acre, 200 or about 200 gram per acre, 225 or about 225 gram per acre, 250 or about 250 gram per acre, 275 or about 275 gram per acre, 300 or about 300 gram per acre, 325 or about 325 gram per acre, 350 or about 350 gram per acre, 375 or about 375 gram per acre, 400 or about 400 gram per acre, 425 or about 425 gram per acre, 450 or about 450 gram per acre, 475 or about 475 gram per acre, 500 or about 500 gram per acre, 525 or about 525 gram per acre, or 550 or about 550 gram per acre. At about 180 gram per acre the amount applied represents about a 33% reduction relative to the amount of chemical herbicide conventionally applied.

In at least one embodiment, the herbicidally active compound can be 3,6-dichloro-2-methoxybenzoic acid (dicamba) and the herbicidally active compound can be formulated so that the herbicidally active compound can be co-applied with a thiocyanate (either each in a separate formulation or both together in a co-formulation including the herbicidally active compound and the thiocyanate) at a rate of from about 500 gram to about 950 gram chemical herbicide per acre, for example, 500 or about 500 gram per acre, 550 or about 550 gram per acre, 600 or about 600 gram per acre, 650 or about 650 gram per acre, 700 or about 700 gram per acre, 750 or about 750 gram per acre, 800 or about 800 gram per acre, 850 or about 850 gram per acre, 900 or about 900 gram per acre, or 950 or about 950 pound per acre. At about 570 gram per acre the amount applied represents about a 33% reduction relative to the amount of chemical herbicide conventionally applied.

In at least one embodiment, the herbicidally active compound can be 2,4-diclorophenoxyacetic acid (2,4-D), and the herbicidally active compound so that the herbicidally active compound can be co-applied with a thiocyanate (either each in a separate formulation or both together in a co-formulation including the herbicidally active compound and the thiocyanate) at a rate of from about 100 gram to about 500 gram chemical herbicide per acre, for example, 100 or about 100 gram per acre, 150 or about 150 gram per acre, 200 or about 200 gram per acre, 250 or about 250 gram per acre, 300 or about 300 gram per acre, 350 or about 350 gram per acre, 400 or about 400 gram per acre, 450 or about 450 gram per acre, or 500 or about 500 gram per acre. At about 115 gram per acre the amount applied represents about a 33% reduction relative to the amount of chemical herbicide conventionally applied.

In at least one embodiment, the herbicidally active compound can be (R,S)-2-amino-4-(hydroxymethyl)phosphonoyl)butanoic acid (glufosinate; phosphinotricin), and the herbicidally active compound can be formulated so that the herbicidally active compound can be co-applied with a thiocyanate und (either each in a separate formulation or both together in a co-formulation including the herbicidally active compound and the thiocyanate) at a rate of from about 450 gram to about 890 gram chemical herbicide per hectare, for example, 450 or about 450 gram per acre, 500 or about 500 gram per acre, 550 or about 550 gram per acre, 600 or about 600 gram per acre, 650 or about 650 gram per acre, 700 or about 700 gram per acre, 750 or about 750 gram per acre, 800 or about 800 gram per acre, 850 or about 850 gram per acre, or 882 or about 890 gram per acre. At about 450 gram per hectare the amount applied represents about a 33% reduction relative to the amount of chemical herbicide conventionally applied.

In at least one embodiment, the herbicidally active compound can be met2-{[4-methoxy-6-methyl-1,3,5-triazin-2-yl)amino]-oxomethyl]sulfamoyl}benzoic acid methyl ester (metsulfuron methyl), and the herbicidally active compound can be formulated so that the herbicidally active compound can be co-applied with a thiocyanate (either each in a separate formulation or both together in a co-formulation including the herbicidally active compound and the thiocyanate) so that it can be applied at a rate of from about 0.9 gram to about 3 gram chemical herbicide per acre, for example, 0.9 gram or about 0.9 gram per acre, 1 or about 1 gram per acre, 1.5 or about 1.5 gram per acre, 2 or about 2 gram per acre, 2.5 or about 2.5 gram per acre, or 3.0 or about 3.0 gram per acre. At about 1.7 gram per acre the amount applied represents about a 33% reduction relative to the amount of chemical herbicide conventionally applied.

In at least one embodiment, the thiocyanate can be included in a formulation and can be applied at a rate of from about 25 gram to about 25 kg thiocyanate per acre, including, for example, from about 250 gram to about 25 kg thiocyanate per acre, from about 500 gram to about 25 kg thiocyanate per acre, from about 1 kilogram to about 25 kg thiocyanate per acre, from about 5 kilogram to about 25 kg thiocyanate per acre, from about 10 kg to about 25 kg thiocyanate per acre, from about 15 kg to about 25 kg thiocyanate per acre, or from about 20 kilogram to about 25 kg thiocyanate per acre.

In at least one embodiment, the thiocyanate can be applied at a rate of about 500 gram per acre to about 20 kg per acre, at about 1 kg per acre to about 20 per acre, at about 1 kg per acre to about 15 kg per acre, or at about 1 kg per acre to about 10 kg per acre.

In at least one embodiment, the thiocyanate can be applied at a rate of for example, 25 gram or about 25 gram per acre, 100 gram or about 100 gram per acre, 250 gram or about 250 gram per acre, 500 gram or about 500 gram per acre, 1 kg or about 1 kg per acre, 2 kg or about 2 kg per acre, 3 kg or about 3 kg per acre, 4 kg or about 4 kg per acre, 5 kg or about 5 kg per acre, 6 kg or about 6 kg per acre, 7 kg or about 7 kg per acre, 8 kg or about 8 kg per acre, 9 kg or about 9 kg per acre, 10 kg or about 10 kg gram per acre, 11 kg or about 11 kg per acre, 12 kg or about 12 kg per acre, 13 kg or about 13 kg per acre, 14 kg or about 14 kg gram per acre, 15 kg or about 15 kg per acre, 16 kg gram or about 16 kg per acre, 17 kg or about 17 kg per acre, 18 kg or about 18 kg per acre, 19 kg or about 19 kg per acre, 20 kg or about 20 kg per acre, 21 kg or about 21 kg per acre, 22 kg or about 22 kg per acre, 23 kg or about 23 kg per acre, 24 kg or about 24 kg per acre, or 25 kg or about 25 kg per acre As hereinbefore noted, in at least one embodiment, a first formulation comprising a herbicidally active compound and a second formulation comprising a thiocyanate can be sequentially co-applied to control a weed plant. Thus, for example, a first formulation comprising a herbicidally active compound can be applied at a particular day, and a second formulation comprising a thiocyanate compound can be applied one 1 day thereof, 2 days or within 2 days thereof, 3 days or within 3 days thereof, 4 days or within 4 days thereof, 5 days or within 5 days thereof, 6 days or within 6 days thereof, 7 days or within 7 days thereof, 8 days or within 8 days thereof, 9 days or within 9 days thereof, 10 days or within 10 days thereof, 11 days or within 11 days thereof, within 12 days or within 12 days thereof, 13 days or within 13 days thereof, or 14 days or within 14 days thereof. Conversely, a first formulation comprising a thiocyanate can be applied at a particular day, and a second formulation comprising a herbicidally active chemical compound can be applied one 1 day thereof, 2 days or within 2 days thereof, 3 days or within 3 days thereof, 4 days or within 4 days thereof, 5 days or within 5 days thereof, 6 days or within 6 days thereof, 7 days or within 7 days thereof, 8 days or within 8 days thereof, 9 days or within 9 days thereof, 10 days or within 10 days thereof, 11 days or within 11 days thereof, within 12 days or within 12 days thereof, 13 days or within 13 days thereof, or 14 days or within 14 days thereof.

In at least one embodiment, a first formulation comprising herbicidally active compound and a second formulation comprising a thiocyanate can be simultaneously, or more or less simultaneously co-applied to control a weed plant.

In at least one embodiment, a herbicidally active compound and a thiocyanate compound can be co-formulated in a single formulation and then applied to control a weed plant.

In at least one embodiment, the formulations of the present disclosure can be applied to weed plants pre-emergence of the cultivated plant.

In at least one embodiment, the formulations of the present disclosure can be applied to the weed plants, post emergence of the cultivated plant.

The degree of control may be varied as desired. Thus, for example, growth of weed plants upon application of the formulation, may be controlled so that weed plant growth is retarded or stunted, or so that the weeds plant are killed.

In order to apply the formulations, the formulations may be sprayed, including by targeted spraying or broadcast spraying of the weed plant, or by wiping the foliage of a weed plant. Thus, for example, liquid formulations are preferably placed in a device that can contain the liquid formulation and permits application of the liquid formulation to the weed plants, including any conventional dispensing or spraying device for herbicidal treatment, including any spray tank. In at least one embodiment, the spraying device can be a hand-held spray bottle for household use from which the liquid formulation can be dispensed, thus permitting home and garden use of the liquid formulation.

It is noted in at least one embodiment, the formulations may be specifically targeted to weed plants, while limiting contact of the formulation with cultivated plants, including the foliage of cultivated plants, growing in the proximity of the weed plants. Such targeted application may be achieved using, for example, a spray tank or spray bottle. Thus, for example, berm weeds around an agricultural field may be sprayed in this manner, or, similarly, individual weed plants or patches containing weed plants in home gardens may be sprayed. Thus, the formulations can be said to be useful for the selective application to weed plants located in the proximity of cultivated plants.

It is further noted that, in at least one embodiment, the formulations of the present disclosure may be co-applied with at least one further herbicidal formulation (i.e. a formulation containing a second herbicidally active compound (other than thiocyanate) or a pesticidal formulation. Co-application can in at least one embodiment be achieved by pre-mixing, or tank-mixing each of each individual formulations (i.e. at least one, and preferably two of the formulations of the present disclosure, and the further herbicidal or pesticidal formulation), and subsequently applying the pre-mixed formulations. Co-application in at least one other embodiment can be achieved by applying a first formulation (i.e. at least one, and preferably two, of the formulations of the present disclosure) and subsequently applying the further herbicidal or pesticidal formulation, or vice versa. Generally, the further formulation can be applied less than 10 days following the application of the first and/or second formulations of the present disclosure, for example less than 5 days, within 1 to 2 days, for example.

Thus, in at least one embodiment, the formulations of the present disclosure may be co-applied with another (i.e. second) herbicidal formulation, or, for example, with another insecticidal or a fungicidal formulation. These further herbicidal or pesticidal formulations contain active compounds, i.e. herbicides, insecticides and fungicides, respectively.

Example herbicides that may be co-applied with the formulations of the present disclosure include lipid synthesis inhibitors, for example, acetyl CoA carboxylase (ACCase) inhibitors, such as aryloxyphenoxypropionates (FOPs) (e.g. clodinafop-propargyl, cyhalofop-buytyl, cyclofop-methyl, fenoxaprop-P-ethyl, fluazifop-P-butyl, haloxyfop-R-methyl, propaquizafop, or quizalofop-P-ethyl), cyclohexadiones (DIMs) (e.g. alloxydim, butroxydim, clethodim, cycloxydim, profoxydim, sethoxydim, tepraloxydim, or tralkoxydim), or phenylpyrazolins (DENs) (e.g. pinoxaden).

Further example herbicides that may be co-applied with the formulations of the present disclosure include amino acid synthesis inhibitors, for example, acetolacate (ALS) inhibitors, such as an imidazolinones (e.g. imazapic, imazamethabenz-methyl, imazamox, imazampyr, imazaquin, imazethapyr) pyrimidinyl(thio)benzoates (e.g. bispyribac-Na, pyribenzoxim, pyriftalid, pyrithiobac-Na, or pyriminobac-methyl), sulfonylaminocarbonyltriazolinones (e.g. flucarbazone-Na or propoxycarbazone-Na), sulfonylureas (e.g. amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, flupyrsulfuron-methyl-Na, foramsulfuron, halosulfuron-methyl, imazosulfuron, iodosulfuron, mesosulfuron, metsulfuron-methyl, nicosulfuron, oxasulfuron, primisulfuron-methyl, prosulfuron, pyrazosulfuron-ethyl, rimsulfuron, sulfometuron-methyl, sulfosulfuron, thislfuron-methyl, triasulfuron, tribenuron-methyl, trifloxysulfuron, triflusulfuron-methyl, or tritosulfuron), or triazolopyrimidines (e.g. cloransulam-methyl, diclosulam, florasulam, flumetsulam, metosulam, or penosulam); or other amino acid synthesis inhibitors, for example, EPSP synthase inhibitors, such as a glycine (e.g. glyphosate or sulfosate).

Further example herbicides that may be co-applied with the formulations of the present disclosure include root growth inhibitors, for example microtubule inhibitors, such as benzamides (e.g. isoxaben), benzoic acids (e.g. chorthal-dimethyl (DCPA)), dinitroanilines (e.g. benefin (benfluralin), butralin, dinitramine, ethalfluralin, oryzalin, pendmethalin, or trifluralin) phosphoramidates (e.g. amiprophos-methyl or butamiphos), or pyridines (e.g. dithiopyr or thiazopyr).

Further example herbicides that may be co-applied with the formulations of the present disclosure include plant growth inhibitors, such as benzoic acids (e.g. chorthal-dimethyl (DCPA)), phenoxycarboxylic acids (e.g. clomeprop, 2,4-D, 2,4-DB, dichlorprop (2,4-DP), 2-methyl-4-chlorophenoxyacetic acid (MCPA), 4-4(-chloro-2-methylphenoxy)butanoic acid (MCPB), or mecoprop (MCPP, CMPP), pyridine carboxylic acid (e.g. clopyralid, fluroxypyr, picloram, or triclopyr), or quinoline carboxylic acids (quinclorac or quinmerac).

Further example herbicides that may be co-applied with the formulations of the present disclosure include photosynthesis inhibitors, such as triazines (e.g. ametrine, atrazine, cyanazine, desmetryne, dimethametryne, prometon, prometryne, propazine, simazine, simatryne, terbumeton, terbuthylazine, terbutryne trietazine), triazinones (e.g. hexazinone, metamitron, or metribuzin), phenylcarbamates (e.g. desmedipham or phenmedipham), pyridazinones (e.g. pyrazon (chloridazon)), uracils (e.g. bromacil, lenacil, or terbacil), nitriles (e.g. bromofenoxim, bromoxynil, or ioxynil), benzothadiazinones (e.g. bentazon), phenylpyridazines (e.g. pyridate or pyridafol), ureas (e.g. chlorobromuron, chlorotoluron, chloroxuron, dimefuron, diuron, ethidimuron, fenuron, fluometron, isoproturon, isouron, linuron, methabenzthiazuron, metobromuron, metoxuron, monolinuron, neburon, siduron, or tebuthioron), or amides (e.g. propanil or pentanochlor).

Further example herbicides that may be co-applied with the formulations of the present disclosure include nitrogen metabolism inhibitors, for example, glutamine synthesis inhibitors, such as phosphinic acids (e.g. glufosinate ammonium or bialaphos (bilanaphos)).

Further example herbicides that may be co-applied with the formulations of the present disclosure include pigment synthesis inhibitors, for example, 4-hydroxyphenylpyruvate dioxygenase (HPPD) inhibitors, such as amides, anilidex, furanones, phenoxybutan-amides, pyrazoles (e.g. pyrasulfotole, benzofenap, pyrazolynate, or pyrazoxyfen) pyrazolones (e.g. topramezone) pyridazinones (e.g. norflurazon), pyridines, triketones (e.g. mesotrione, bicyclopyrone, or tembotrione) or isoxazoles (e.g. isoxaflutole or isoxachlortole); or diterpene synthesis inhibitors, such as isoxalidinones (e.g. clomazone).

Further example herbicides that may be co-applied with the formulations of the present disclosure include cell membrane disruptors, for example, protoporphyrinogen oxidase (PPO) inhibitors, such as diphenylethers (e.g. acifluorfen-Na, bifenox, chlomomethoxyfen, fluoroglycofen-ethyl, fomesafen, halosafen, lactfen, or oxyfluorfen), aryl triazolinones (e.g. carfentrazone-ethyl), N-phenylphtalamides (e.g. cinidon-ethyl, flumioxazin, or flumiclorac-pentyl), oxadiazoles (e.g. oxadiazon or oxadiargyl), oxazolidinediones (e.g. pentoxazone), phenylpyrazoles (e.g. fluazolate or pyraflufen-ethyl), pyrimidindiones (e.g. benzfendizone or butafencil), or thiadiazoles (e.g. fluthiacet-methyl or thidiazimin); and other membrane disruptors, including, for example, dinitrophenols (e.g. 4,6 dinitro-o-cresol (DNOC), dinoseb, or dinoterb); and further including (photosystem 1) PSI inhibitors, including bipyridilium (e.g. diquat or paraquat).

Further example herbicides that may be co-applied with the formulations of the present disclosure include shoot growth inhibitors, for example, very long chain fatty acid (VLCFA) inhibitors, such as chloroacetamides (e.g. acetochlor, alachlor, or butachlor), acetamides (e.g. diphenamid, napropamide, or naproanilide), oxyacetamides, or tetrazolinones (e.g. azafenidin, cafentrazone-ethyl, or sulfentrazone).

Yet further example herbicides that may be co-applied with the formulations of the present disclosure include unclassified herbicides including disodium methyl arsonate (DMSA), fosamine, monosodium methane arsonate (MSMA), indaziflam, cinmethylin, methiozolin, acrolein, ammonium sulfate (AMS), benazolin, benoxacor, cacodylic acid, cloquintocet-mexyl, copper chelate, copper sulfate, cyprosulfamide, dicchlormid, dietholate, dimethipin, enothall, fenchlorazole-ethyl, fenchlorim, fluxofenim, maleic hydrazide, mefenpyr-diethyl, mefluidide, metaborate, oxaziclomefone, or sodium chlorate.

Turning now to insecticides that may be co-applied with the formulations of the present disclosure, examples of insecticides that may be co-applied include inorganic insecticidal compounds, for example, arsenic compounds (e.g. lead arsenite, arsenic trioxide, or copper acetoarsenate (Paris green); or fluoride compounds (e.g. sodium fluoride or sodium fluoroaluminate (cryolite)).

Further examples of insecticides that that may be co-applied with the formulations of the present disclosure include soaps and oils, for example, water emulsions of petroleum distillates, or insecticidal soaps derived from animal or vegetable oils.

Further examples of insecticides that that may be co-applied with the formulations of the present disclosure include botanical extracts.

Further examples of insecticides that that may be co-applied with the formulations of the present disclosure include pyrethrum, which can be used together with a synergistic compound such as piperonyl butoxide.

Further examples of insecticides that that may be co-applied with the formulations of the present disclosure include organochlorines, also known as chlorinated hydrocarbons, for example, dichlorodiphenyltrichloroethane (DDT) and related compounds (e.g. methoxychlor and kelthane), lindane, toxaphene, or cyclodienes (e.g. aldrin, dieldrin, endrin, chordane, heptachlor, or endusulfan).

Further examples of insecticides that that may be co-applied with the formulations of the present disclosure include nerve poisonous insecticides, such as organophosphates, including, for example general purpose organophosphate insecticides such as malathion, parathion, diazinon, chlorpyrofos, azinphosmethyl, acephate, phorate or phosmet; fumigant organophosphate insecticides, such as 2,2-dichlorovinyl dimethyl phosphate (dichlorvos, DDVP); or systemic organophosphate insecticides, such as dimethoate, disulfoton, dimeton, or ronnel).

Further examples of insecticides that that may be co-applied with the formulations of the present disclosure include carbamates, such as carbaryl (sevin), carbofuran, propoxur, methomyl, bendiocarb, formetanate, oxamyl, or aldicarb, for example.

Further examples of insecticides that that may be co-applied with the formulations of the present disclosure include synthetic pyrethroids such as resmethrin, permethrin, or fenvalerate, for example.

Further examples of insecticides that that may be co-applied with the formulations of the present disclosure include foramidines, such as chlordimeform or amitraz, for example.

Further examples of insecticides that that may be co-applied with the formulations of the present disclosure include organosulfurs and organtins, such as aramite, tetradifon, cyhexatin, or hexakis, for example.

Further examples of insecticides that that may be co-applied with the formulations of the present disclosure include avermectins, such as avermectin, abamectin, or ivermectin, for example.

Further examples of insecticides that that may be co-applied with the formulations of the present disclosure include neonicotinoids, such as imidacloprid, for example.

Turning now to fungicides that may be co-applied with the formulations of the present disclosure, examples of fungicides that may be co-applied include mitosis interrupting compounds, such as methyl benzimidazole carbamates, for example, benzimidazoles or thiophanates (e.g. thiophanate-methyl).

Further examples of fungicides that may be co-applied with the formulations of the present disclosure include nicotinamide adenine dinucleotide (NADH) signaling interrupting compounds, such as dicarboximides, iprodione, for example.

Further examples of fungicides that may be co-applied with the formulations of the present disclosure include sterol biosynthesis inhibitors, such as demethylation inhibitors, for example, difenoconazole, fenarimol, fenbuconazole, metconazole, myclobutanil, propiconazole, tebuconazole, or triflumizole.

Further examples of fungicides that may be co-applied with the formulations of the present disclosure include RNA polymerase inhibitors, such as phenyl amides, for example, mefenoxam.

Further examples of fungicides that may be co-applied with the formulations of the present disclosure include succinate dehydrogenase inhibitors such as carboxamides, for example, boscalid.

Further examples of fungicides that may be co-applied with the formulations of the present disclosure include methionine biosynthesis inhibitors, such as, anilino pyrimidines, for example, cyprodinil.

Further examples of fungicides that may be co-applied with the formulations of the present disclosure include respiration inhibitors, such as quinone outside inhibitors, for example, azoxystrobin, kresoxim-methyl, pyraclostrobin, or trifloxystrobin.

Further examples of fungicides that may be co-applied with the formulations of the present disclosure include signal transduction interfering compounds, such as azanaphtanlenes, for example quinolines (e.g. quinoxyfen).

Further examples of fungicides that may be co-applied with the formulations of the present disclosure include protein synthesis inhibitors, such as a glucopyranosyl antibiotic, for example, streptomycin; or a tetracycline antibiotic, for example, oxytetracycline.

Further examples of fungicides that may be co-applied with the formulations of the present disclosure include phosphonates, such as salts of phosphorous acid, or aluminum tris.

Further examples of fungicides that may be co-applied with the formulations of the present disclosure include multi-site contact activity compounds such as inorganic compounds, for example copper hydroxide, fixed copper, or sulfur; dithiocarbamates and related compounds, for example thiram or ziram; phthalimides, for example, captan; chloronitriles (phthalonitriles), for example chlorothalonil; or guanidines, for example, dodine.

Yet further examples of fungicides that may be co-applied with the formulations of the present disclosure include azadirachtin, bifenazate, or dicofol.

It will be understood, that in another aspect the present disclosure provides a use of a thiocyanate preparation. Accordingly, in one aspect the present disclosure provides, in at least one embodiment, a use of a thiocyanate preparation to prepare an herbicidal formulation to control growth of a weed plant, the herbicidal formulation comprising an herbicidally effective amount of an herbicidally active chemical compound and a thiocyanate, together with an herbicidally acceptable diluent, carrier or excipient.

It will further be understood that in another aspect, the present disclosure provides a use of a liquid formulation comprising a thiocyanate preparation. Accordingly, in one aspect the present disclosure provides, in at least one embodiment, a use of an herbicidal formulation comprising an herbicidally effective amount of an herbicidally active chemical compound and a thiocyanate compound to control growth of the weed plant by foliar application of the liquid formulation.

In another aspect, the present disclosure provides, in at least one embodiment, a kit or commercial package for controlling growth of a weed plant comprising:

(a) an herbicidal formulation comprising an herbicidally effective amount of an herbicidally active chemical compound and a thiocyanate compound; and
(b) instructions for the application to foliage of a weed plant to thereby control growth of the weed plant.

In another aspect, the present disclosure provides, in at least one embodiment, a kit or commercial package for controlling growth of a weed plant comprising:

(c) a first formulation comprising an herbicidally effective amount of an herbicidally active chemical compound;
(d) a second formulation comprising a thiocyanate; and
(c) instructions for the co-application of the first and second formulation to a weed plant to thereby control growth of the weed plant.

Thus it will now be clear that the methods and compositions of the present disclosure permit the control of growth of weed plants by applying the compositions containing an herbicidally effective amount of an herbicidally active chemical compound and a thiocyanate thereto. Hereinafter are provided examples of specific embodiments for performing the methods of the present disclosure. The examples are provided for illustrative purposes only, and are not intended to limit the scope of the present disclosure in any way.

EXAMPLES

Example 1—Preparing a Glucosinolate Hydrolysate Comprising Thiocyanate

A thiocyanate enriched hydrolysate was prepared as follows: *Sinapis alba* seed was expelled to mechanically separate a portion of the seed oil and generate a partially de-oiled meal. The meal was mixed into 60° C. water at 10 parts water to 1 part meal. The slurry was agitated and held at temperature for about 10 hours such that the seed myrosinase hydrolyzed the bulk of the glucosinolates to thiocyanate. After the reaction period, the slurry was processed by centrifugation using a decanter to generate a liquid phase enriched in thiocyanate and extracted solids. The liquid phase was then evaporated to concentrate the solubles, and then evaporator syrup was spray dried to produce a product containing about 5% thiocyanate on a dry matter basis. This thiocyanate containing glucosinolate hydrolysate can be mixed with water for multiple applications including use as a herbicide.

Example 2—Weed Growth Control Using a Herbicidal Formulation Including a Herbicidal Formulation Including Glyphosate Co-Formulated with a Thiocyanate A total of 8 herbicide treatments were run in a field trial as follows:

TABLE 2

Treatments for Weed Control Trial.

| Treatment | Rate: Undiluted RT540 (Glyphosate) | Rate: MustGrow SCN kg/acre |
|---|---|---|
| 1 | — | — |
| 2 | 0.1 | — |
| 3 | 0.2 | — |
| 4 | 0.4 | — |
| 5 | 0.6 | — |
| 6 | 1.0 | — |
| 7 | — | 24.3 |
| 8 | 0.1 | 24.3 |

Figure 3:
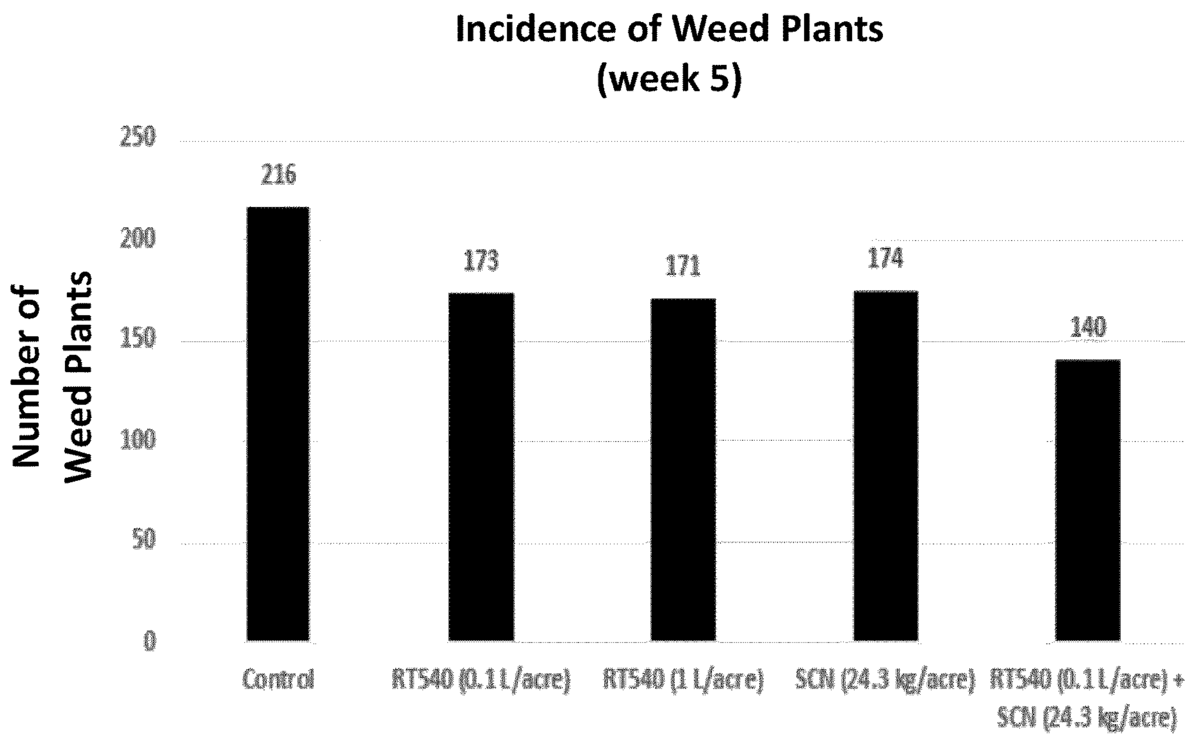
FIG. 3 shows a bar graph obtained in the performance of certain experiments, notably the performance of field trial experiments in which test plots were treated with various herbicidal formulations (denoted between each bar), and the number of weed plants in the individual test plots were counted (counts denoted above each bar), 5 weeks after the treatment with the herbicidal formulation. A control plot (Control) was not treated with any formulation.

RT540®, Bayer CropScience contains 540 g/L of glyphosate as the active ingredient. MustGrow SCN consists of pure commercially purchased thiocyanate in powder form. RT540 and MustGrow SCN were diluted with 10 parts of water and applied using a backpack sprayer to each of the test plots located in central Saskatchewan at the rate indicated in Table 2. Each treatment consisted of triplicate experimental plots (4×20 ft). Weed plant growth was monitored by counting individual weed plants present on each of the test plots over a period of 5 weeks from application. Average incidence of weeds for each treatment are shown in Table 3 and FIG. 3.

TABLE 3

Effect of Glyphosate and Thiocyanate on the Incidence of Weeds

| | Treatments | | | | | | | |
|---|---|---|---|---|---|---|---|---|
| Week | Control | RT 540 (0.1 L/acre) | RT540 (0.2 L/acre) | RT540 (0.4 L/acre) | RT540 (0.6 L/acre) | RT540 (1 L/acre) | MustGrow SCN** (24.3 kg/acre) | RT540 (0.1 L/acre) + MustGrow SCN (24.3 kg/acre) |
| 1 | 24 | 25 | 16 | 11 | 17 | 21 | 8 | 19 |
| 2 | 29 | 40 | 20 | 12 | 16 | 21 | 15 | 20 |
| 3 | 74 | 66 | 73 | 23 | 37 | 86 | 75 | 54 |
| 4 | 175 | 166 | 191 | 157 | 137 | 172 | 155 | 115 |
| 5 | 216 | 173 | 184 | 132 | 198 | 171 | 174 | 140 |

*RT540 at 1 L/acre 540 g glyphosate/acre.

**MustGrow SCN delivers SCN at 24.3 kg/acre AITC.

Under the conditions of this trial, glyphosate was marginally effective in limiting the incidence of weeds. Using the highest application rate of RT540 (a rate of 1 L/acre undiluted RT540 equaling 540 gram glyphosate per acre) resulted in only a 20% suppression in the number of weeds 5 weeks after treatment. Similar results were obtained using the lowest application rate of RT540 (a rate of 0.1 L/acre undiluted RT540 equaling 540 gram glyphosate per acre) and using 24.3 kg/acre thiocyanate. However, when the lowest application rate of RT540 was used in combination with thiocyanate the incidence of weed was suppressed by 35%. This data is consistent with a synergistic effect whereby enhanced weed suppression is obtained using a combination of low levels of glyphosate and 24.3 kg/acre of thiocyanate.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

The invention claimed is:

1. A method for controlling growth of a weed plant, the method comprising co-applying N-(phosphomethyl)glycine (glyphosate), or an herbicidally acceptable salt thereof, and thiocyanate, wherein the relative applied dry weight of thiocyanate to the relative applied dry weight of N-(phosphomethyl)glycine (glyphosate), or an herbicidally acceptable salt thereof, is selected to be 450:1 to 550:1, and wherein the thiocyanate is applied at a rate of from 10 kilogram to 25 kilogram thiocyanate per acre.

2. A method according to claim 1, wherein a first formulation comprising N-(phosphomethyl)glycine (glyphosate), or an herbicidally acceptable salt thereof and a second formulation comprising the thiocyanate are sequentially co-applied to the weed plant or wherein the N-(phosphomethyl)glycine (glyphosate), or an herbicidally acceptable salt thereof and the thiocyanate are co-formulated to form a co-formulated herbicidal formulation, and the co-formulated herbicidal formulation is applied to the weed plant.

3. A method according to claim 1, wherein the thiocyanate is allyl thiocyanate (ATC) or a thiocyanate ion (SCN).

4. A method according to claim 1, wherein the thiocyanate is included in a hydrolyzed glucosinolate preparation.

5. A method according to claim 4, wherein the hydrolyzed glucosinolate preparation is a plant seed extract or a plant seed meal extract.

6. A method according to claim 1, wherein the weed plant is a dicotelydenous weed plant, monocotelydenous weed plant or a perennial weed plant.

7. A method according to claim 1, wherein the relative applied dry weight of thiocyanate to the relative applied dry weight of N-(phosphomethyl)glycine (glyphosate), or a herbicidally acceptable salt thereof, is selected to be 500:1.

* * * * *